United States Patent
Yamada et al.

(10) Patent No.: US 10,506,604 B2
(45) Date of Patent: Dec. 10, 2019

(54) DEVICE TO-DEVICE COMMUNICATIONS APPARATUS AND METHODS

(71) Applicant: Sharp Laboratories of America, Inc., Camas, WA (US)

(72) Inventors: Shohei Yamada, Osaka (JP); Jia Sheng, Vancouver, WA (US); John Michael Kowalski, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 352 days.

(21) Appl. No.: 14/660,587

(22) Filed: Mar. 17, 2015

(65) Prior Publication Data

US 2015/0327240 A1    Nov. 12, 2015

Related U.S. Application Data

(60) Provisional application No. 61/990,658, filed on May 8, 2014.

(51) Int. Cl.
    *H04W 72/04*    (2009.01)
    *H04W 8/00*    (2009.01)
    (Continued)

(52) U.S. Cl.
    CPC ......... *H04W 72/048* (2013.01); *H04W 8/005* (2013.01); *H04W 72/02* (2013.01);
    (Continued)

(58) Field of Classification Search
    CPC ... H04W 76/048; H04W 76/23; H04W 8/005; H04W 72/02
    (Continued)

(56) References Cited

U.S. PATENT DOCUMENTS 9,332,512 B2    5/2016    Sebire
9,445,316 B2    9/2016    Lu
(Continued)

FOREIGN PATENT DOCUMENTS

CN          103718514 A      4/2014
WO    WO 2013/109100 A1    7/2013
(Continued)

OTHER PUBLICATIONS

International Search Report and Written Opinion dated Aug. 11, 2015 in PCT Application PCAT/US2015/21045.
(Continued)

*Primary Examiner* — Kabir A Timory
(74) *Attorney, Agent, or Firm* — Nixon & Vanderhye P.C.

(57) ABSTRACT

A wireless terminal ($26_1$) which is in wireless communications with a radio access node (22) over a radio interface (24) makes a determination regarding a type of radio resources that the wireless terminal may use for device-to-device (D2D) communications with another wireless terminal. Upon occurrence of a predetermined physical layer condition, the wireless terminal may use at least some wireless terminal autonomous selected device-to-device (D2D) radio resources for device-to-device (D2D) communications with another wireless terminal ($26_2$) when the wireless terminal is in coverage of the radio access network. The wireless terminal providing the node with an indication of capability of the wireless terminal to support multi-channel communications comprising plural frequency bands; and the wireless terminal may use at least one of the plural frequency bands for device-to-device (D2D) communications.

6 Claims, 20 Drawing Sheets

(51) Int. Cl.
  *H04W 72/02* (2009.01)
  *H04W 76/23* (2018.01)
  *H04W 88/06* (2009.01)
  *H04W 8/24* (2009.01)
  *H04W 76/14* (2018.01)

(52) U.S. Cl.
  CPC .............. *H04W 76/23* (2018.02); *H04W 8/24* (2013.01); *H04W 76/14* (2018.02); *H04W 88/06* (2013.01)

(58) Field of Classification Search
  USPC ....................................................... 455/226.1
  See application file for complete search history.

(56) References Cited

U.S. PATENT DOCUMENTS

| | | |
|---|---|---|
| 2003/0061390 A1 | 3/2003 | Schaller et al. |
| 2007/0115884 A1 | 5/2007 | Shang |
| 2011/0092204 A1 | 4/2011 | Iwamura et al. |
| 2011/0182280 A1 | 7/2011 | Charbit et al. |
| 2011/0255509 A1 | 10/2011 | Huang |
| 2012/0122463 A1 | 5/2012 | Chen |
| 2012/0129540 A1 | 5/2012 | Hakola |
| 2013/0051277 A1 | 2/2013 | Hakola et al. |
| 2013/0051288 A1 | 2/2013 | Ishii |
| 2013/0070615 A1 | 3/2013 | Lennartson et al. |
| 2013/0102314 A1 | 4/2013 | Koskela |
| 2013/0109301 A1 | 5/2013 | Hakola et al. |
| 2013/0148637 A1* | 6/2013 | Yang et al. ................. 370/336 |
| 2013/0155962 A1 | 6/2013 | Hakola et al. |
| 2013/0188546 A1 | 7/2013 | Turtinen et al. |
| 2013/0195026 A1 | 8/2013 | Johnsson et al. |
| 2013/0208697 A1 | 8/2013 | Hwang et al. |
| 2013/0223356 A1 | 8/2013 | Khoshnevis |
| 2013/0230015 A1 | 9/2013 | Hoymann et al. |
| 2013/0288668 A1 | 10/2013 | Pragada et al. |
| 2013/0308490 A1 | 11/2013 | Lim |
| 2013/0322276 A1 | 12/2013 | Pelletier et al. |
| 2013/0322413 A1 | 12/2013 | Pelletier et al. |
| 2013/0324114 A1 | 12/2013 | Raghothaman et al. |
| 2013/0331054 A1 | 12/2013 | Kodali |
| 2014/0004867 A1 | 1/2014 | Noh |
| 2014/0010172 A1 | 1/2014 | Wei et al. |
| 2014/0056220 A1 | 2/2014 | Poitau et al. |
| 2014/0086176 A1 | 3/2014 | Liu |
| 2014/0098761 A1 | 4/2014 | Lee |
| 2014/0106757 A1* | 4/2014 | Hakola ................. H04W 36/32 455/440 |
| 2014/0128078 A1 | 5/2014 | Zhu et al. |
| 2014/0148177 A1 | 5/2014 | Ratasuk |
| 2014/0153390 A1 | 6/2014 | Ishii |
| 2014/0153417 A1* | 6/2014 | Gupta et al. ................. 370/252 |
| 2014/0169346 A1 | 6/2014 | Futaki |
| 2014/0185530 A1 | 7/2014 | Kuchibhotla |
| 2014/0187283 A1 | 7/2014 | Nimbalker |
| 2014/0198655 A1 | 7/2014 | Ishii |
| 2014/0213221 A1* | 7/2014 | Chai ................. H04W 36/30 455/411 |
| 2014/0233528 A1 | 8/2014 | Webb |
| 2014/0269419 A1 | 9/2014 | Han |
| 2014/0274066 A1 | 9/2014 | Fodor |
| 2014/0314057 A1 | 10/2014 | Van Phan et al. |
| 2014/0328329 A1 | 11/2014 | Novlan et al. |
| 2014/0342738 A1 | 11/2014 | Ishii |
| 2014/0342747 A1 | 11/2014 | Lee et al. |
| 2014/0349659 A1 | 11/2014 | Ishii |
| 2015/0043448 A1 | 2/2015 | Chatterjee |
| 2015/0071207 A1 | 3/2015 | Seo |
| 2015/0078279 A1 | 3/2015 | Ko |
| 2015/0139006 A1 | 5/2015 | Seo |
| 2015/0146687 A1 | 5/2015 | Kim |
| 2015/0208453 A1 | 7/2015 | Yamazaki |
| 2015/0215767 A1 | 7/2015 | Siomina |
| 2015/0215881 A1 | 7/2015 | Parkvall |
| 2015/0215903 A1 | 7/2015 | Zhao et al. |
| 2015/0215977 A1 | 7/2015 | Yamazaki |
| 2015/0215981 A1* | 7/2015 | Patil ................. H04W 76/023 370/329 |
| 2015/0223184 A1 | 8/2015 | Bergstrom |
| 2015/0245193 A1 | 8/2015 | Xiong |
| 2015/0245307 A1 | 8/2015 | Chen |
| 2015/0257153 A1 | 9/2015 | Yamazaki |
| 2015/0264588 A1 | 9/2015 | Li |
| 2015/0264733 A1 | 9/2015 | Guo |
| 2015/0271720 A1 | 9/2015 | Yamada et al. |
| 2015/0271807 A1 | 9/2015 | Patil |
| 2015/0271841 A1 | 9/2015 | Yamada et al. |
| 2015/0271846 A1 | 9/2015 | Kowalski et al. |
| 2015/0304919 A1 | 10/2015 | Jung |
| 2015/0312821 A1 | 10/2015 | Yamazaki |
| 2015/0312923 A1 | 10/2015 | Guo |
| 2015/0319797 A1 | 11/2015 | Yamada et al. |
| 2015/0327047 A1 | 11/2015 | Tiirola |
| 2015/0327240 A1 | 11/2015 | Yamada et al. |
| 2015/0334669 A1 | 11/2015 | Zhang |
| 2016/0021594 A1 | 1/2016 | Yilmaz |
| 2016/0044618 A1 | 2/2016 | Sheng et al. |
| 2016/0081073 A1 | 3/2016 | Lindoff |
| 2016/0094975 A1 | 3/2016 | Sheng |
| 2016/0100401 A1 | 4/2016 | Xiong |
| 2016/0112172 A1 | 4/2016 | Seo |
| 2016/0127970 A1 | 5/2016 | Chuang |
| 2016/0143078 A1 | 5/2016 | Jeong |
| 2016/0183076 A1 | 6/2016 | Bagayoko |
| 2016/0192269 A1 | 6/2016 | Kim |
| 2016/0192426 A1 | 6/2016 | Noh |
| 2016/0205534 A1 | 7/2016 | Fujishiro |
| 2016/0212665 A1 | 7/2016 | Fukuta |
| 2016/0212721 A1 | 7/2016 | Sheng |
| 2016/0219528 A1 | 7/2016 | Kawasaki |
| 2016/0219566 A1 | 7/2016 | Jung |
| 2016/0219574 A1 | 7/2016 | Ribeiro |
| 2016/0262111 A1 | 9/2016 | Boudreau |
| 2016/0269953 A1 | 9/2016 | Jung et al. |
| 2016/0278009 A1 | 9/2016 | Sorrentino |
| 2016/0345307 A1 | 11/2016 | Huang et al. |
| 2016/0381630 A1 | 12/2016 | Krishnamoorthy |
| 2017/0006653 A1 | 1/2017 | Zeng et al. |
| 2017/0071001 A1 | 3/2017 | Ahmadi |
| 2017/0164381 A1 | 6/2017 | Kim et al. |

FOREIGN PATENT DOCUMENTS

| | | |
|---|---|---|
| WO | 2013/171115 A1 | 11/2013 |
| WO | 2013/083197 A1 | 12/2013 |
| WO | WO 2014/014326 A1 | 1/2014 |
| WO | 2015/063186 A1 | 5/2015 |

OTHER PUBLICATIONS

R1-150954, 3GPP TSG-RAN Meeting #80, Change Request, "Correction of Discovery Signal Transmission", Ericsson, Athens, Greece, Feb. 9-13, 2015.
R1-150959, 3GPP TSG-RAN WG1 Meeting #80, Change Request, "Introduction of D2D Feature into 36.212", Huawei, Athens, Greece, Feb. 9-13, 2015.
R2-144223, 3GPP TSG RAN WG2 Meeting #87bis, "Further Mode 2 Switching Rules in RLF Exceptional Case", Sharp, Shanghai, China, Oct. 6-10, 2014.
R1-150899, 3GPP TSG-RAN WG1 Meeting #80, Change Request, "Introduction of ProSe", Alcatel-Lucent, Athens, Greece, Feb. 9-13, 2015.
R1-150961, 3GPP TSG-RAN Meeting #80, Change Request, "Inclusion of ProSe", Ericsson, Athens, Greece, Feb. 9-13, 2015.
R1-150962, 3GPP TSG-RAN Meeting #80, Change Request, "Introduction of D2D (ProSe) Feature into 36.213", Editor (Motorola Mobility), Athens, Greece, Feb. 9-13, 2015.
R1-150252, 3GPP TSG-RAN Meeting #80, Change Request, "Inclusion of Measurement for ProSe", Ericsson, Athens, Greece, Feb. 9-13, 2015.

(56) References Cited

OTHER PUBLICATIONS

R2-150645, 3GPP TSG-RAN WG2 Meeting #89, Change Request, "Corrections to Stage 2 Description of ProSe", Intel Corporation, Fujitsu, InterDigital, Huawei, HiSilicon, ZTE, Athens, Greece, Feb. 9-13, 2015.
R2-150699, 3GPP TSGRAN WG2 #89, Change Request, "Introduction of ProSe", LG Electronics Inc., Samsung, ZTE, Athens, Greece, Feb. 9-13, 2015.
R2-150700, 3GPP TSGRAN WG2 #89, Change Request, "Introduction of ProSe", Qualcomm Inc., Athens, Greece, Feb. 9-13, 2015.
R2-150717, 3GPP TSGRAN WG2 #89, Change Request, "Introduction of ProSe", Ericsson, Athens, Greece, Feb. 9-13, 2015.
R2-150570, 3GPP TSGRAN WG2 #89, Change Request, "Introduction of ProSe Direct Communication", Qualcomm Incorporated, Samsung, Athens, Greece, Feb. 9-13, 2015.
R2-150571, 3GPP TSGRAN WG2 #89, Change Request, "Introduction of ProSe Direct Communication", Qualcomm Incorporated, Potevio, Athens, Greece, Feb. 9-13, 2015.
R2-150734, 3GPP TSG-RAN2 #89 Meeting, Change Request, "Introduction of ProSe", Samsung, Athens, Greece, Feb. 9-13, 2015.
RP-150366, TSG-RAN Meeting #67, "CRs to 36.201, 36.211, 36.212, 36.213 & 36.214 to Introduce D2D Feature", TSG RAN WG1, Shanghai, China, Mar. 9-12, 2015.
RP-150374, 3GPP TSG RAN Meeting #67, "RAN2 Agreed CRs on LTE Device to Device Proximity Services", TSG RAN WG2, Shanghai, China, Mar. 9-12, 2015.
FiTS User's Manual for Business Partner, Nov. 19, 2013.
3GPP TS 36.212 v12.3.0, Technical Specification, $3^{rd}$ Generation Partnership Project; Technical Specification Group Radio Access Network; Evolved Universal Terrestrial Radio Access (E-UTRA); Multiplexing and Channel Coding (Release 12) (Dec. 2014).
3GPP TS 36.213 v12.0.0, Technical Specification, $3^{rd}$ Generation Partnership Project; Technical Specification Group Radio Access Network; Evolved Universal Terrestrial Radio Access (E-UTRA); Physical Layer Procedures (Release 12) (Dec. 2013).
3GPP TS 36.201 v12.1.0, Technical Specification, $3^{rd}$ Generation Partnership Project; Technical Specification Group Radio Access Network; Evolved Universal Terrestrial Radio Access (E-UTRA); LTE Physical Layer; General Description (Release 12) (Dec. 2014).
3GPP TS 36.211 v12.4.0, Technical Specification, $3^{rd}$ Generation Partnership Project; Technical Specification Group Radio Access Network; Evolved Universal Terrestrial Radio Access (E-UTRA); Physical Channels and Modulation (Release 12) (Dec. 2014).
3GPP TS 36.214 v12.1.0, Technical Specification, $3^{rd}$ Generation Partnership Project; Technical Specification Group Radio Access Network; Evolved Universal Terrestrial Radio Access (E-UTRA); Physical Layer; Measurements (Release 12) (Dec. 2014).
3GPP TS 36.300 v12.4.0, Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; State 2 (Release 12) (Dec. 2014).
3GPP TS 36.306 v12.3.0, Technical Specification, $3^{rd}$ Generation Partnership Project; Technical Specification Group Radio Access Network; Evolved Universal Terrestrial Radio Access (E-UTRA); User Equipment (UE) Radio Access Capabilities (Release 12) (Dec. 2014).
3GPP TS 36.331 v12.4.0, Technical Specification, $3^{rd}$ Generation Partnership Project; Technical Specification Group Radio Access Network; Evolved Universal Terrestrial Radio Access (E-UTRA); Radio Resource Control (RRC) Protocol Specification (Release 12) (Dec. 2014).
3GPP TS 36.321 v12.4.0, Technical Specification, $3^{rd}$ Generation Partnership Project; Technical Specification Group Radio Access Network; Evolved Universal Terrestrial Radio Access (E-UTRA); Medium Access Control (MAC) Protocol Specification (Release 12) (Dec. 2014).
3GPP TS 36.322 v12.1.0, Technical Specification, $3^{rd}$ Generation Partnership Project; Technical Specification Group Radio Access Network; Evolved Universal Terrestrial Radio Access (E-UTRA); Radio Link Control (RLC) Protocol Specification (Release 12) (Sep. 2014).
3GPP TS 36.323 v12.2.0, Technical Specification, $3^{rd}$ Generation Partnership Project; Technical Specification Group Radio Access Network; Evolved Universal Terrestrial Radio Access (E-UTRA); Packet data Convergence Protocol (PDCP) Specification (Release 12) (Dec. 2014).
3GPP TS 36.304 v12.3.0, Technical Specification, $3^{rd}$ Generation Partnership Project; Technical Specification Group Radio Access Network; Evolved Universal Terrestrial Radio Access (E-UTRA); User Equipment (UE) Procedures in Idle Mode (Release 12) (Dec. 2014).
3GPP TR 36.843, v1.2.0, Technical Report, $3^{rd}$ Generation Partnership Project, Technical Specification Group Radio Access Network; Study of LTE Device to Device Proximity Services; Radio Aspects (Release 12) (Feb. 2014).
R2-141854, 3GPP TSG-RAN Working Group 2 meeting #85bis, "Report of 3GPP TSG RAN WG2 meting #85, Prague, Czech Republic, Feb. 10-14, 2013", ETSI MCC, Valencia, Spain, Mar. 31-Apr. 4, 2014.
Office Action dated Nov. 18, 2016 in U.S. Appl. No. 14/660,491.
International Preliminary Report on Patentability dated Nov. 17, 2016 in PCT Application PCT/US2015/021045.
Office Action dated Sep. 22, 2016 in U.S. Appl. No. 14/660,528.
Office Action dated Jan. 18, 2017 in U.S. Appl. No. 14/660,528.
RP-122009, 3GPP TSG RAN Meeting #58, "Study on LTE Device to Device Proximity Services", Qualcomm Incorporated, Dec. 7, 2012.
International Search Report and Written Opinion dated Jun. 25, 2015 in PCT Application No. PCT/US2015/21034.
Office Action dated Oct. 17, 2016 in U.S. Appl. No. 14/660,622.
RP-140126, 3GPP TSG-RAN WG #63, Fukuoka, Japan, Mar. 3-6, 2014, Cover Sheet for TR 36.843 v1.2.0 on "Study of LTE Device Proximity Services; Radio Aspects", Qualcomm Incorporated (Rapporteur).
Office Action dated Sep. 30, 2016 in U.S. Appl. No. 14/660,559.
International Search Report and Written Opinion dated Jun. 25, 2015 in PCT Application No. PCT/US2015/21041.
International Search Report and Written Opinion dated Jun. 25, 2015 in PCT Application No. PCT/US2015/21027.
Office Action dated Jan. 18, 2017 in U.S. Appl. No. 14/818,855.
International Search Report and Written Opinion dated Oct. 23, 2015 in PCT Application PCT/US15/43784.
U.S. Appl. No. 62/055,114, filed Sep. 25, 2014, entitled "Method and Apparatus for Unlicensed Communications Band Access".
U.S. Appl. No. 62/104,365, filed Jan. 16, 2015, entitled "Method and Apparatus for Selecting a Synchronization Signal Source for Device-To-Device Communications".
R2-142829, 3GPP TSG-RAN2 Meeting #86, "Introduction of ProSe", Samsung, Qualcom Incorporation, Seoul, South Korea, May 19-23, 2014.
R1-141256, 3GPP TSG RAN WG1 Meeting #76bis, "Distributed Resource Allocation for D2D Communication", Alcatel-Lucent Shanghai Bell, Alcatel-Lucent, Shen Zhen, China, Mar. 31-Apr. 4, 2014.
R1-141546, 3GPP TSG RAN WG1 Meeting #76bis, Discussion on D2D Operation Outside of Network Coverage (Mode-2), Intel Corporation, Shenzhen, China, Mar. 31-Apr. 4, 2014.
R1-141859, 3GPP TSG RAN WG1 Meeting #76bis, "Way Forward on Discovery Signal Design and Network Assistance", NTT DOCOMO, Huawei, HiSilicon, Samsung, Sony, Sharp, ZTE, LG Electronics, Hitachi, ETRI, Media Tek, Shenzhen, China, Mar. 31-Apr. 4, 2014.
3GPP TS 23.303 V12.0.0 Technical Specification, $3^{rd}$ Generation Partnership Project; Technical Specification Group Services and Systems Aspects; Proximity-based Services (ProSe); Stage 2 (Release 12) (Feb. 2014).
R2-14XXX, 3GPP TSG RAN WG1 Meeting #87, Introduction of ProSe, Samsun, Dresden, German, Aug. 18-22, 2014.

(56) References Cited

OTHER PUBLICATIONS

R1-142409 3GPP TSG RAN WG1 Meeting #77, Ericsson, "Synchronization Signals and Channel Design for D2D", Seoul, Korea, May 19-23, 2014.
R1-142340 3GPP TSG RAN WG1 Meeting #77, Huawei, HiSilicon, "D2DSS Design", Seoul, Korea, May 19-23, 2014.
R1-133598 3GPP TSG-RAN WG1 #74 Qualcomm Inc., "Techniques for Synchronization", Barcelona, Spain, Aug. 19-23, 2013.
3GPP TSG RAN WG1 #76BIS, "Chairman's notes", Shenzhen, China, Mar. 31-Apr. 4, 2014.
3GPP TSG RAN WG1 Meeting #77, "Chairman's notes", Seoul, Korea, May 19-23, 2014.
R1-142452 3GPP TSG-RAN WG1 Meeting #77, Nokia, NSN, "D2D Synchronization Signal Design", Seoul, Korea, May 19-23, 2014.
R1-141974 3GPP TSG-RAN WG1 #77, Qualcomm Incorporated, "Signal Design for D2D Synchronization", Seoul, Korea, May 19-23, 2014.
R1-135316 3GPP TSG-RAN WG1 #75, Qualcomm Incorporated, "Multi-hop D2D Synchronization Performance", San Francisco USA, Nov. 11-15, 2013.
International Search Report and Written Opinion dated Jul. 1, 2015 in PCT Application PCT/US2015/21030.
Final Office Action dated Feb. 28, 2017 in U.S. Appl. No. 14/660,559.
Final Office Action dated Apr. 5, 2017 in U.S. Appl. No. 14/660,491.
Office Action dated Sep. 12, 2017 in U.S. Appl. No. 14/660,559.
Office Action dated Sep. 12, 2017 in U.S. Appl. No. 14/660,491.
Notice of Allowance dated Sep. 8, 2017 in U.S. Appl. No. 14/818,855.
Final Office Action dated Dec. 11, 2017 in U.S. Appl. No. 14/660,528.
Office Action dated Jul. 27, 2017 in U.S. Appl. No. 14/660,528.
Supplementary EP Search Report dated Oct. 16, 2017 in EP application 15764859.3.
Notice of Allowance dated May 2, 2017 in U.S. Appl. No. 14/818,855.
Advisory Action dated Jun. 14, 2017 in U.S. Appl. No. 14/660,559.
R2-152168, 3GPP TSG-RAN WG2 Meeting #90, Intel Corporation "Priority Handling for ProSe", Fukuoka, Japan, May 25-29, 2015.
R2-144812, 3GPP TSG RAN WG2 #88, Acert Incorporation, "Cell reselection priority with ProSe communication", San Francisco, USA, Nov. 17-21, 2014.
R2-142631, 3GPP TSG-RAN WGS #86, "Prioritized reselection of D2D supported frequency", Seoul, Korea, May 19-23, 2014.
Advisory Action dated Jun. 23, 2017 in U.S. Appl. No. 14/660,491.
RP-140416, 3GPP TSG RAN meeting #63, Status Report to TSG, Fukuoka, Japan, Mar. 3-6, 2014.
R1-141166, 3GPP TSG RAN WG1 Meeting $76bis, Intel Corporation, Discussion on D2DSS Physical Structure, Shenzhen, China, Mar. 31-Apr. 4, 2014.
R1-141380, 3GPP TSG RAN WG1 Meeting #76bis, Ericsson, "Synchronization Signals and Channel Design for D2D Discovery and Communication", Shenzhen, China, Mar. 31-Apr. 4, 2014.
R2-141715, 3GPP TSG-RAN WG2 $86bis, D2D communication configuration and signaling (control part), Valencia, Spain, Mar. 31-Apr. 4, 2014.
R2-140312, 3GPP TSG-RAN WG2 #85, Intel Corporation, "Resource allocation for D2D communication", Prague, Czech Republic, Feb. 10-14, 2014.
R2-140625, 3GPP TSG-RAN WG2, #85, Ericsson, "Resource allocation for D2D transmitters in coverage", Prague, Czech Republic, Feb. 10-14, 2014.
R2-140797, 3GPP TSG-RAN WG2 #85, Ericsson, "Overview of D2D Functions needing standardization", Prague, Czech Republic, Feb. 10-14, 2014.
R2-134238, 3GPP TSG-RAN WG2 #84, Ericsson, "D2D Scheduling Procedure", San Francisco, USA, Nov. 11-15, 2013.
Notice of Allowance dated Mar. 15, 2018 in U.S. Appl. No. 14/660,528.
Notice of Allowance dated Apr. 11, 2018 in U.S. Appl. No. 14/660,559.
Final Office Action dated May 29, 2018 in U.S. Appl. No. 14/660,491.

* cited by examiner

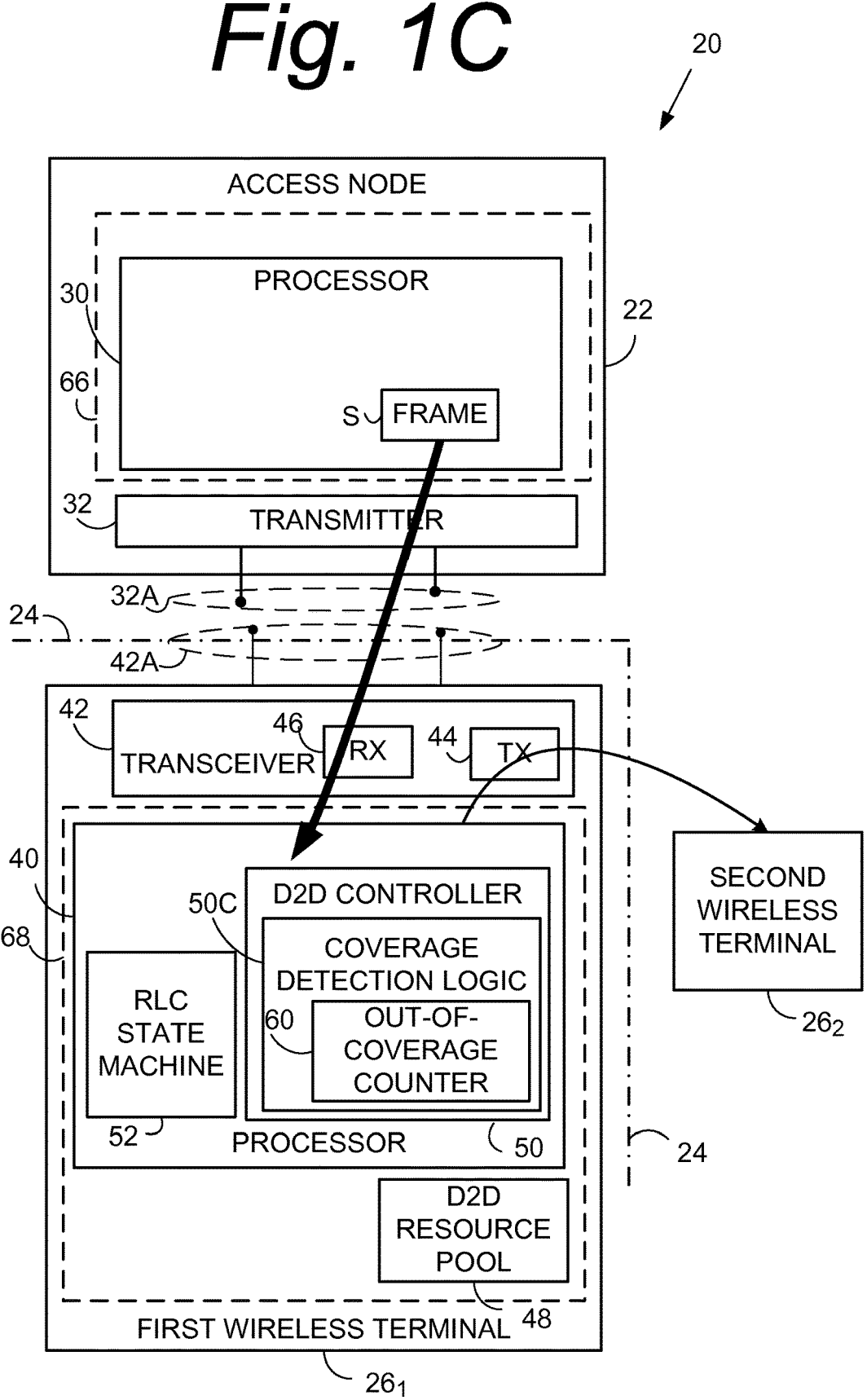

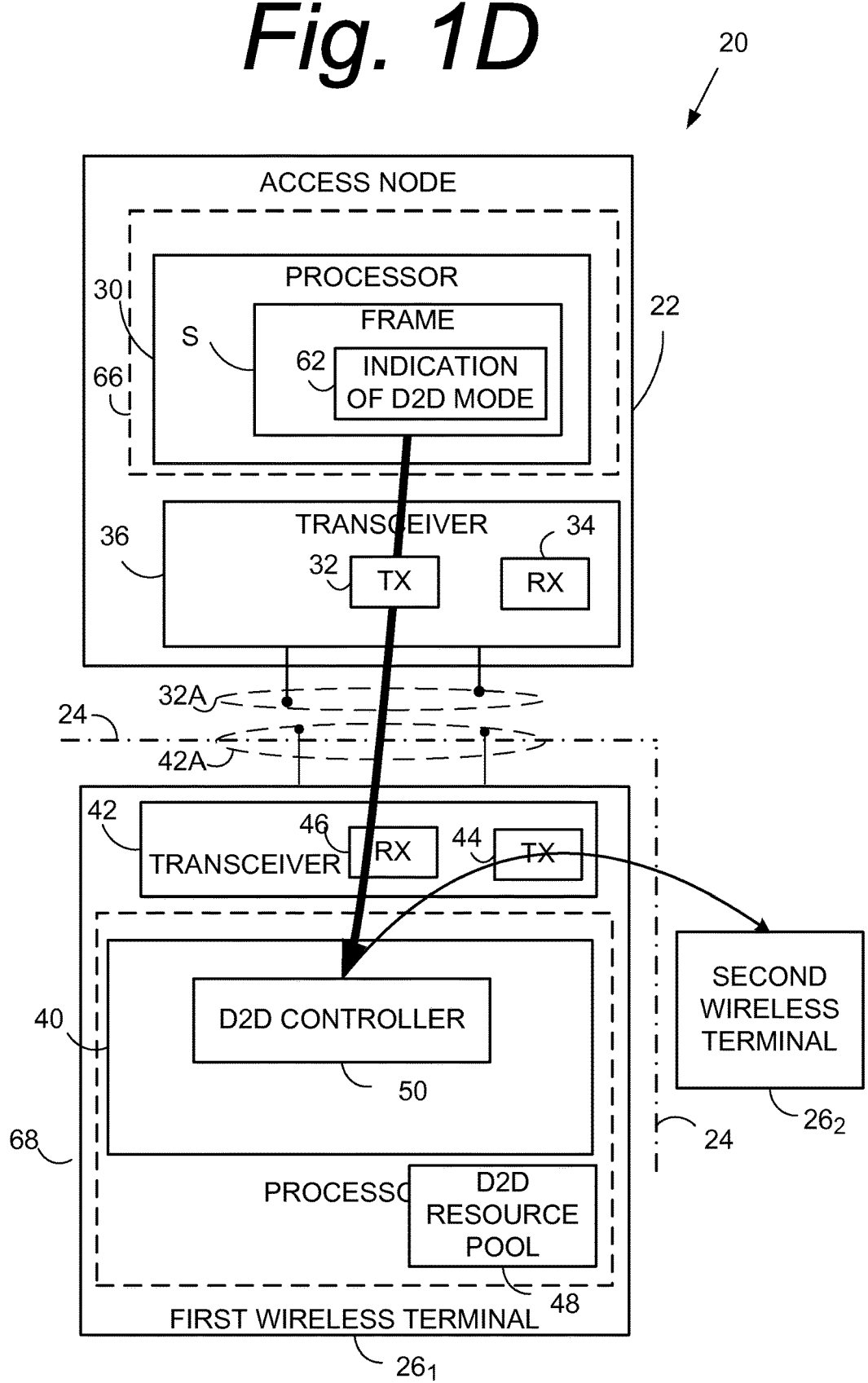

MCC_1.B

MCC_1.A

MCC_3.A

MCC_3.B

MCC_5

MCC_5

DEVICE TO-DEVICE COMMUNICATIONS APPARATUS AND METHODS

This application claims the priority and benefit of the following United States Provisional Patent application, which is incorporated herein by reference: U.S. Provisional Patent application 61/990,658 filed May 8, 2014, entitled "DEVICE-TO-DEVICE RESOURCE ALLOCATION METHODS BASED ON USER EQUIPMENT RADIO FREQUENCY CAPABILITY".

The following United States patent applications are incorporated herein by reference:

U.S. patent application Ser. No. 14/660,528, filed Mar. 17, 2015, entitled "SCHEDULING WIRELESS DEVICE-TO-DEVICE COMMUNICATIONS";

U.S. patent application Ser. No. 14/660,491, filed Mar. 17, 2015, entitled "DEVICE-TO-DEVICE COMMUNICATIONS APPARATUS AND METHODS";

U.S. patent application Ser. No. 14/660,559, filed Mar. 17, 2015, entitled "DEVICE-TO-DEVICE COMMUNICATIONS APPARATUS AND METHODS";

U.S. patent application Ser. No. 14/660,587, filed Mar. 17, 2015, entitled "DEVICE-TO-DEVICE COMMUNICATIONS APPARATUS AND METHODS";

U.S. patent application Ser. No. 14/660,622, filed Mar. 17, 2015, entitled "DEVICE-TO-DEVICE COMMUNICATIONS APPARATUS AND METHODS".

TECHNICAL FIELD

The technology relates to wireless communications, and particularly to allocating or granting radio resources for wireless device-to-device (D2D) communications.

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station. In general, communications between a network node such as a base station and a wireless terminal is known as "WAN" or "Cellular communication".

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and data traffic (referred to herein as "communication signals") from one user equipment terminal to one or more other user equipment terminals may not be communicated through a base station or other network control device of a telecommunication system. Device-to-device (D2D) communication has more recently also become known as "sidelink direct communication".

D2D communication, e.g., sidelink direct communication, can be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for third and fourth generation wireless communication systems. The 3GPP may define specifications for next generation mobile networks, systems, and devices. The 3GPP LTE is the name given to a project to improve the Universal Mobile Telecommunications System ("UMTS") mobile phone or device standard to cope with future requirements. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which D2D communication may be used. A non-exhaustive list of 3GPP documents which describe, at least in part, device-to-device (D2D) communication (e.g., "sidelink direct communication") include the following (all of which are incorporated herein by reference in their entireties):

3GPP TS 36.201 v12.1.0, Technical Specification, $3^{rd}$ Generation Partnership Project; Technical Specification Group Radio Access Network; Evolved Universal Terrestrial Radio Access (E-UTRA); LTE Physical Layer; General Description (Release 12) (2014-12);

3GPP TS 36.211 v12.4.0, Technical Specification, $3^{rd}$ Generation Partnership Project; Technical Specification Group Radio Access Network; Evolved Universal Terrestrial Radio Access (E-UTRA); Physical Channels and Modulation (Release 12) (2014-12);

3GPP TS 36.212 v12.3.0, Technical Specification, $3^{rd}$ Generation Partnership Project; Technical Specification Group Radio Access Network; Evolved Universal Terrestrial Radio Access (E-UTRA); Multiplexing and Channel Coding (Release 12) (2014-12);

3GPP TS 36.213 v12.0.0, Technical Specification, $3^{rd}$ Generation Partnership Project; Technical Specification Group Radio Access Network; Evolved Universal Terrestrial Radio Access (E-UTRA); Physical Layer Procedures (Release 12) (2013-12);

3GPP TS 36.214 v12.1.0, Technical Specification, $3^{rd}$ Generation Partnership Project; Technical Specification Group Radio Access Network; Evolved Universal Terrestrial Radio Access (E-UTRA); Physical Layer; Measurements (Release 12) (2014-12);

3GPP TS 36.300 v12.4.0, Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; State 2 (Release 12) (2014-12);

3GPP TS 36.304 v12.3.0, Technical Specification, $3^{rd}$ Generation Partnership Project; Technical Specification Group Radio Access Network; Evolved Universal Terrestrial Radio Access (E-UTRA); User Equipment (UE) Procedures in Idle Mode (Release 12) (2014-12);

3GPP TS 36.306 v12.3.0, Technical Specification, $3^{rd}$ Generation Partnership Project; Technical Specification Group Radio Access Network; Evolved Universal Terrestrial Radio Access (E-UTRA); User Equipment (UE) Radio Access Capabilities (Release 12) (2014-12);

3GPP TS 36.321 v12.4.0, Technical Specification, $3^{rd}$ Generation Partnership Project; Technical Specification Group Radio Access Network; Evolved Universal Terrestrial Radio Access (E-UTRA); Medium Access Control (MAC) Protocol Specification (Release 12) (2014-12);

3GPP TS 36.322 v12.1.0, Technical Specification, 3rd Generation Partnership Project; Technical Specification Group Radio Access Network; Evolved Universal Terrestrial Radio Access (E-UTRA); Radio Link Control (RLC) Protocol Specification (Release 12) (2014-9);

3GPP TS 36.323 v12.2.0, Technical Specification, $3^{rd}$ Generation Partnership Project; Technical Specification Group Radio Access Network; Evolved Universal Terrestrial Radio Access (E-UTRA); Packet data Convergence Protocol (PDCP) Specification (Release 12) (2014-12); and 3GPP TS 36.331 v12.4.0, Technical Specification, 3rd Generation Partnership Project; Technical Specification Group Radio Access Network; Evolved Universal Terrestrial Radio Access (E-UTRA); Radio Resource Control (RRC) Protocol Specification (Release 12) (2014-12).

Device to device (D2D) communications provide proximity-based applications and services, representing an emerging social-technological trend. The introduction of a Proximity Services (ProSe) capability in LTE allows the 3GPP industry to serve this developing market, and, at the same time, serve the urgent needs of several Public Safety communities that are jointly committed to LTE. The current assumptions related to D2D communication is that a wireless terminal within network coverage uses resources for D2D discovery and communication assigned by the controlling node. If the wireless terminal is out of network coverage, it may use pre-assigned resources for communications. If the wireless terminal incorrectly determines its situation of in/out of network coverage, e.g., if the wireless terminal tries to use the pre-assigned resources within network coverage, it may affect the current LTE networks with strong interference and thereby be very dangerous. Therefore, a problem which needs to be solved for D2D communications is how the wireless terminal determines whether it is in or out of network coverage.

D2D services include ProSe Direct Communication (e.g., D2D communication, sidelink direct communication) and ProSe Direct Discovery (e.g., D2D discovery, sidelink direct discovery). ProSe Direct Communication is a mode of communication whereby two wireless terminals can communicate with each other directly over the PC5 interface (i.e., direct interface between two wireless terminals). This communication mode is supported when the wireless terminal is served by E-UTRAN and when the wireless terminal is outside of E-UTRA coverage. A transmitter wireless terminal transmits a Scheduling assignment (SA) to indicate the resources it is going to use for data transmission to the receiver wireless terminals. ProSe Direct Discovery is defined as the procedure used by the ProSe-enabled wireless terminal to discover other ProSe-enabled wireless terminal(s) in its proximity using E-UTRA direct radio signals via the PC5 interface.

Generally, the network coverage detection should be based on the downlink received power. In current 3GPP specification TS 36.213, Version 12.0.0, see http://www.3gpp.org/DynaReport/36213.htm, the downlink received power is measured with respect to cell-specific reference signal strength. The coverage can be defined by wireless terminal's downlink received power measurement, or be defined by wireless terminal's RRC state for simpler implementation and specification work. The downlink radio link quality of the primary cell is monitored by the wireless terminal for the purpose of indicating out-of-sync/in-sync status to higher layers. The physical layer in the wireless terminal shall, in radio frames where the radio link quality is assessed, indicate out-of-sync to higher layers through a radio link failure (RLF) report when the radio link quality is worse than the threshold Qout. When the radio link quality is better than the threshold Qin, the physical layer in the wireless terminal shall, in radio frames where the radio link quality is assessed, indicate in-sync to higher layers.

Reusing the out-of-sync definition for out-of-coverage detection in relation to D2D communication has several problems. For example, the RLF is only declared when the UE wireless terminal in RRC_CONNECTED mode. Furthermore, even the RLF is reported to be a correct out-of-coverage indication, it is for the primary cell only, i.e., the wireless terminal may still be in coverage of other usable networks in the same area.

A wireless terminal in Long Term Evolution (LTE) may be in one of two LTE radio resource control (RRC) states or modes: RRC_IDLE or RRC_CONNECTED. A wireless terminal is in RRC_CONNECTED when an RRC connection has been established. If this is not the case (i.e., if no RRC connection is established) the wireless terminal is in RRC_IDLE state. For RRC Idle mode wireless terminal, some metrics, such as the synchronization signal (SS) strength or broadcast signal strength, may be defined as measurement of out-of-coverage. However, these metrics are very complicated to be implemented in LTE networks. All of these bring new heavy burdens to legacy LTE networks.

For reasons mentioned above, in D2D communications when the D2D service and LTE cellular service share the same frequency band, the wireless terminal needs to behave correctly based on whether it is in or outside the coverage of network, so as to minimize its compact (interference) on the present networks, e.g., LTE networks. A problem in this area is to detect the network coverage accurately and efficiently, so that (among other reasons) the wireless terminal in device-to-device (D2D) communications will not interfere with network operation.

What is needed, therefore, among other things are methods, apparatus, and/or techniques for selecting resource utilization methods for purposes such as controlling behavior of a device-to-device (D2D) capable wireless terminal and detecting network coverage for purposes such as ascertaining whether a device-to-device (D2D) capable wireless terminal is in-coverage or out-of-coverage, such as (for example) when the wireless terminal is in Idle Mode. The methods, apparatus, and/or techniques provide benefits that reduce system complexity and improve communication flexibility and efficiency.

In D2D communications, if the D2D service and LTE cellular service share the same frequency, the resource allocation to UE needs to be performed correctly based on whether it is in or outside the coverage of network, so as to minimize its compact (interference) on the present networks, e.g., LTE networks. On the other hand, the issue of load balancing may also be pertinent for an in coverage scenario when one resource allocation method cannot have adequate resources for allocation while another method still has enough resources.

As the above mentioned resource allocation problem is closely related to the detection of coverage, the detection problem can easily be solved by methods associated with legacy LTE RRC states (in the agreements of 3GPP TSG RAN WG2 Meeting #85-bis), e.g., the UE is in coverage if it is in RRC_CONNECTED state. However, if the UE supports multi-carrier communications, the problem becomes more complicated. A complication may arise, for example, when one carrier of the UE is in RRC_CONNECTED mode, and another carrier has no RRC connection.

SUMMARY

In one of its aspects the technology disclosed herein concerns a method in a wireless terminal which is in wireless communications with a radio access node over a radio interface. In a basic example embodiment and mode the method comprises the wireless terminal making a determination regarding a type of radio resources that the wireless terminal may use for device-to-device (D2D) communications with another wireless terminal. The determination comprises:

(1) making a first mode determination that the wireless terminal should use network-allocated radio resources in accordance with one or more of the following:
  (1a) the wireless terminal is in a Radio Resource Control (RRC) Connected state and the wireless terminal is configured by the node to use the network-allocated radio resources;
  (1b) the wireless terminal is in a Radio Resource Control (RRC) Idle state and camps on a cell;
  (1c) the wireless terminal has a downlink signal strength higher than a predetermined threshold;
  (1d) the wireless terminal is informed by dedicated information from the node to use the network-allocated radio resources;
  (1e) the wireless terminal is informed by broadcasted information from the node to use the network-allocated radio resources;
  (1f) the wireless terminal is not informed by dedicated information from the node to use the wireless terminal autonomous selected radio resources;
  (1g) the wireless terminal is not informed by broadcasted information from the node to use the wireless terminal autonomous selected radio resources;

(2) making a second mode determination that the wireless terminal should use wireless terminal autonomous selected radio resources in accordance with one or more of the following:
  (2a) the wireless terminal is in a Radio Recourse Control (RRC) Idle state;
  (2b) the wireless terminal cannot camp on any cell;
  (2c) the wireless terminal has a downlink signal strength lower than a predetermined threshold;
  (2d) the wireless terminal experiences a predetermined radio link problem;
  (2e) the wireless terminal is informed by dedicated information from the node to use the wireless terminal autonomous selected radio resources;
  (2f) the wireless terminal is informed by broadcasted information from the node to use the wireless terminal autonomous selected radio resources;
  (2g) the wireless terminal is not informed by dedicated information from the node to use the network-allocated radio resources;
  (2h) the wireless terminal is not informed by broadcasted information from the node to use the network-allocated radio resources.

The method further comprises using for the device-to-device (D2D) communications the radio resources according to either the first mode determination or the second mode determination.

In an example embodiment and mode the method further comprises transmitting device-to-device (D2D) signals to another wireless terminal using the radio resources according to either the first mode determination or the second mode determination.

In an example embodiment and mode the method further comprises the wireless terminal making the first mode determination that the wireless terminal should use the network-allocated radio resources if the wireless terminal is in a Radio Resource Control (RRC) Connected state and the wireless terminal is permitted by the node to use the network-allocated radio resources; and the wireless terminal making the second mode determination that the wireless terminal should use the wireless terminal autonomous selected radio resources if the wireless terminal is either in a Radio Recourse Control (RRC) Idle state and the wireless terminal is permitted by the node to use the wireless terminal autonomous selected radio resources; or in a Radio Resource Control (RRC) Connected state and the wireless terminal is permitted by the node to use the wireless terminal autonomous selected radio resources.

In an example embodiment and mode the method further comprises the wireless terminal making the second mode determination that the wireless terminal should use wireless terminal autonomous selected radio resources when the wireless terminal experiences the predetermined radio link problem, and wherein the predetermined radio link failure comprises a RLF failure or repeated failure of a RRC connection request when a UE camps on a cell.

In another of its aspects the technology disclosed herein concerns a wireless terminal which is in wireless communications with a radio access node over a radio interface. The wireless terminal comprises a transceiver configured for radio communications with the node and for device-to-device (D2D) communications with another wireless terminal and a processor. The processor is configured to make a determination regarding a type of radio resources that the wireless terminal may use for device-to-device (D2D) communications with another wireless terminal. In particular the processor is configured:

(1) to make a first mode determination that the wireless terminal should use network-allocated radio resources in accordance with one or more of the following:
  (1a) the wireless terminal is in a Radio Resource Control (RRC) Connected state and the wireless terminal is configured by the node to use the network-allocated radio resources;
  (1b) the wireless terminal is in a Radio Resource Control (RRC) Idle state and camps on a cell;
  (1c) the wireless terminal has a downlink signal strength higher than a predetermined threshold;
  (1d) the wireless terminal is informed by dedicated information from the node to use the network-allocated radio resources;
  (1e) the wireless terminal is informed by broadcasted information from the node to use the network-allocated radio resources;
  (1f) the wireless terminal is not informed by dedicated information from the node to use the wireless terminal autonomous selected radio resources;
  (1g) the wireless terminal is not informed by broadcasted information from the node to use the wireless terminal autonomous selected radio resources;

(2) to make a second mode determination that the wireless terminal should use wireless terminal autonomous selected radio resources in accordance with one or more of the following:
  (2a) the wireless terminal is in a Radio Recourse Control (RRC) Idle state;
  (2b) the wireless terminal cannot camp on any cell;
  (2c) the wireless terminal has a downlink signal strength lower than a predetermined threshold;
  (2d) the wireless terminal experiences a predetermined radio link problem;
  (2e) the wireless terminal is informed by dedicated information from the node to use the wireless terminal autonomous selected radio resources;

(2f) the wireless terminal is informed by broadcasted information from the node to use the wireless terminal autonomous selected radio resources;
(2g) the wireless terminal is not informed by dedicated information from the node to use the network-allocated radio resources;
(2h) the wireless terminal is not informed by broadcasted information from the node to use the network-allocated radio resources.

The transceiver is configured to use for the device-to-device (D2D) communications the radio resources according to either the first mode determination or the second mode determination.

In an example embodiment the transceiver is configured to transmit device-to-device (D2D) signals to another wireless terminal using the radio resources according to either the first mode determination or the second mode determination.

In an example embodiment the processor is further configured to make the first mode determination that the wireless terminal should use the network-allocated radio resources if the wireless terminal is in a Radio Resource Control (RRC) Connected state and the wireless terminal is permitted by the node to use the network-allocated radio resources; and to make the second mode determination that the wireless terminal should use the wireless terminal autonomous selected radio resources if the wireless terminal is either in a Radio Recourse Control (RRC) Idle state and the wireless terminal is permitted by the node to use the wireless terminal autonomous selected radio resources; or in a Radio Resource Control (RRC) Connected state and the wireless terminal is permitted by the node to use the wireless terminal autonomous selected radio resources.

In an example embodiment the processor is further configured to make the second mode determination that the wireless terminal should use wireless terminal autonomous selected radio resources when the wireless terminal experiences the predetermined radio link problem, and wherein the predetermined radio link failure comprises a RLF failure or repeated failure of a RRC connection request when a UE camps on a cell.

In another of its aspect the technology disclosed herein concerns a method in a wireless terminal which is in wireless communications with a radio access node over a radio interface. In a basic example embodiment and mode the method comprises, upon occurrence of a predetermined physical layer condition, the wireless terminal using at least some wireless terminal autonomous selected device-to-device (D2D) radio resources for device-to-device (D2D) communications with another wireless terminal when the wireless terminal is in coverage of the radio access network.

In an example embodiment the method further comprises the wireless terminal transmitting device-to-device (D2D) signals to the another wireless terminal using at least some wireless terminal autonomous selected device-to-device (D2D) radio resources when the wireless terminal is in coverage of the radio access network.

In example embodiment and mode the method further comprises the wireless terminal obtaining the at least some wireless terminal autonomous selected device-to-device (D2D) radio resources from a pre-configured pool of radio resources stored in a memory of the wireless terminal.

In an example embodiment the method further comprises the wireless terminal using the at least some wireless terminal autonomous selected device-to-device (D2D) radio resources for device-to-device (D2D) communications with the another wireless terminal until the wireless terminal when in a RRC Connected state receives a subsequent instruction to use different radio resources.

In an example embodiment the predetermined physical layer condition comprises a radio link failure.

In another of its aspects the technology disclosed herein concerns a wireless terminal which is in wireless communications with a radio access node over a radio interface. The wireless terminal comprises a transmitter a transmitter configured for device-to-device (D2D) communications with another wireless terminal and a processor. The processor is configured, upon occurrence of a predetermined physical layer condition, to use at least some wireless terminal autonomous selected device-to-device (D2D) radio resources for the device-to-device (D2D) communications with another wireless terminal when the wireless terminal is in coverage of the radio access network.

In an example embodiment, the transmitter is configured to transmit device-to-device (D2D) signals to the another wireless terminal using at least some wireless terminal autonomous selected device-to-device (D2D) radio resources when the wireless terminal is in coverage of the radio access network.

In an example embodiment the processor is configured to obtain the at least some wireless terminal autonomous selected device-to-device (D2D) radio resources from a pre-configured pool of radio resources stored in a memory of the wireless terminal.

In an example embodiment the processor is further configured to use the at least some wireless terminal autonomous selected device-to-device (D2D) radio resources for device-to-device (D2D) communications with the another wireless terminal until the wireless terminal when receives a subsequent instruction to use different radio resources.

In an example embodiment the predetermined physical layer condition comprises a radio link failure.

In another of its aspects the technology disclosed herein concerns a method in a wireless terminal which is in wireless communications with a radio access node over a radio interface. The method comprises the wireless terminal providing the node with an indication of capability of the wireless terminal to support multi-channel communications comprising plural frequency bands; and the wireless terminal using at least one of the plural frequency bands for device-to-device (D2D) communications.

In an example embodiment and mode, the wireless terminal sends to the node wireless terminal capability information related to support transmission of D2D communications for combinations of the plural frequency bands.

In an example embodiment and mode the indication of capability comprises identification of one or more resource allocations techniques that the wireless terminal is eligible to employ for the multi-band frequencies.

In an example embodiment and mode the method further comprises the wireless terminal making a determination whether the wireless terminal is to use only wireless terminal autonomous selected device-to-device (D2D) radio resources to transmit a device-to-device (D2D) signal in a second carrier frequency to another D2D-capable wireless terminal when the wireless terminal is either (1) in RRC_IDLE mode and camping on a first carrier frequency or (2) in RRC_CONNECTED mode and served by a serving cell in a first carrier frequency.

In an example embodiment and mode the plural frequency bands comprise a first frequency carrier and a second frequency carrier, and the method further comprises the wireless terminal making a determination of one or more resource allocation techniques that the wireless terminal is eligible to employ for the multi-band frequencies, and wherein making the determination of the one or more resource allocation techniques is based on one or more of the following: a radio resource control state of the wireless terminal; and a type of radio resources allocated to a first frequency carrier.

In an example embodiment and mode the indication of capability comprises identification of the one or more resource allocations techniques that the wireless terminal is eligible to employ for the multi-band frequencies.

In an example embodiment and mode the type of radio resources allocated to the first frequency carrier is network-allocated radio resources, and one or more resource allocation techniques that the wireless terminal is eligible to employ for the multi-band frequencies are characterized by ability of the wireless terminal to use wireless terminal autonomous selected radio resources of the second carrier frequency for the device-to-device (D2D) communications.

In another of its aspects the technology disclosed herein concerns a wireless terminal which is in wireless communications with a radio access node over a radio interface. The wireless terminal comprises a transceiver and a processor. The processor is configured to generate an indication of capability of the wireless terminal to support multi-channel communications comprising plural frequency bands. The transceiver is configured to send the indication to the node and which uses at least one of the plural frequency bands for device-to-device (D2D) communications.

In an example embodiment the processor is configured to generate capability information related to support transmission of D2D communications for combinations of the plural frequency bands, and wherein the transceiver sends the capability information to the node.

In an example embodiment the indication of capability comprises identification of one or more resource allocations techniques that the wireless terminal is eligible to employ for the multi-band frequencies.

In an example embodiment the processor is further configured to make a determination whether the wireless terminal is to use only wireless terminal autonomous selected device-to-device (D2D) radio resources to transmit a device-to-device (D2D) signal in a second carrier frequency to another D2D-capable wireless terminal when the wireless terminal is either (1) in RRC_IDLE mode and camping on a first carrier frequency or (2) in RRC_CONNECTED mode and served by a serving cell in a first carrier frequency.

In an example embodiment the plural frequency bands comprise a first frequency carrier and a second frequency carrier, and the processor is further configured to make a determination of one or more resource allocation techniques that the wireless terminal is eligible to employ for the multi-band frequencies. In particular the processor is configured to make the determination of the one or more resource allocation techniques is based on one or more of the following: a radio resource control state of the wireless terminal; and a type of radio resources allocated to a first frequency carrier.

In an example embodiment the indication of capability comprises identification of the one or more resource allocations techniques that the wireless terminal is eligible to employ for the multi-band frequencies.

In an example embodiment, the type of radio resources allocated to the first frequency carrier is network-allocated radio resources, and one or more resource allocation techniques that the wireless terminal is eligible to employ for the multi-band frequencies are characterized by ability of the wireless terminal to use wireless terminal autonomous selected radio resources of the second carrier frequency for the device-to-device (D2D) communications.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 1A-FIG. 1G are schematic views of example embodiments of radio communications networks in which a wireless terminal participate in device-to-device (D2D) communications and implement respective aspects of the technology disclosed herein.

DETAILED DESCRIPTION

Figure 1A:
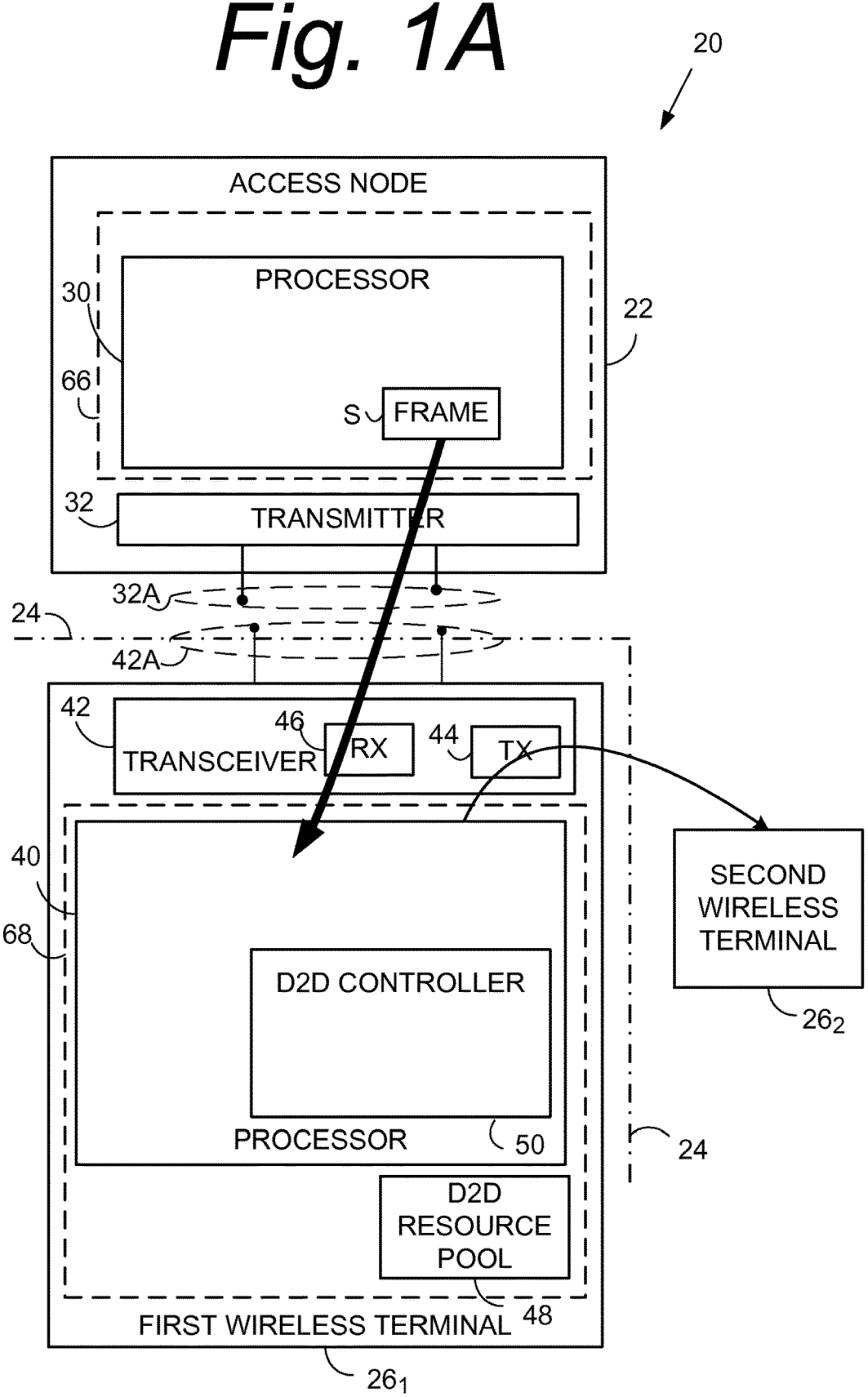

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "device-to-device ("D2D") communication" can refer to a mode of communication between or among wireless terminals that operate on a cellular network or other telecommunications system in which the communication data traffic from one wireless terminal to another wireless terminal does not pass through a centralized base station or other device in the cellular network or other telecommunications system. As explained above, device-to-device (D2D) communication is also known by the more recent term "sidelink direct communication". Communication data is sent using communication signals and can include voice communications or data communications intended for consumption by a user of a wireless terminal Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As used herein, a "D2D signal" or "D2D signals" include channels, reference signals, and synchronization signals for D2D communication and/or discovery.

One of the aspects of the technology disclosed herein provides, e.g., solutions for detecting LTE network coverage for the purpose of D2D communications. Prevailing current consensus is that network coverage detection should be at least based on the downlink received power. However, the technology disclosed herein, rather than requiring any new type of received signal power measurement and/or new processing, takes advantage of and capitalizes upon the already known wireless terminal state information, especially the idle mode UE states, for network coverage detection.

As a prelude to discussion of the out-of-coverage detection methods and apparatus of the technology disclosed herein, brief general overviews are provided of the Idle Mode; of cell classifications and service types for the RRC Idle state, and of basic concepts of cell selection and re-selection.

If a wireless terminal is in RRC_CONNECTED mode, there is normal RRC connection between wireless terminal and the radio access node (e.g., eNodeB), so the wireless terminal is obviously in the network coverage. But when the wireless terminal is in the Idle Mode the wireless terminal may or may not be in network coverage (e.g., in-coverage). TS 36.304 (V 11.6.0) lists five radio resource control (RRC) states for a wireless terminal, three of which pertain to Idle Mode. The three RRC states which pertain to Idle Mode are: "Camped Normally", "Camped on Any Cell"; and "Any Cell Selection".

In the Camped Normally state the wireless terminal selects and monitors the indicated Paging Channels of the cell according to information sent in system information; monitors relevant System Information (SI); performs necessary measurements for the cell reselection evaluation procedure; and executes the cell reselection evaluation process upon occurrence of certain occasions/triggers.

In the Camped on Any Cell state the wireless terminal monitors relevant System Information; performs necessary measurements for the cell reselection evaluation procedure; and executes the cell reselection evaluation process upon occurrence of certain occasions/triggers. In addition, the wireless terminal regularly attempts to find a suitable cell by trying all frequencies of all radio access technologies (RATs) that are supported by the wireless terminal. If a suitable cell is found, the wireless terminal moves to Camped Normally state. If the wireless terminal supports voice services and the current cell does not support emergency call as indicated in System Information, the wireless terminal performs cell selection/reselection to an acceptable cell of any supported RAT regardless of priorities provided in system information from current cell, if no suitable cell is found.

In the Any Cell Selection state the wireless terminal attempts to find an acceptable cell of any public land mobile network (PLMN) to camp on, trying all radio access technologies (RATs) that are supported by the wireless terminal and searching first for a high quality cell.

The action of camping on a cell is necessary to get access to some services. In general, there are three levels of services defined for a wireless terminal. The first service level, limited service, allows emergency calls, Earthquake and Tsunami Warning System (ETWS), and Commercial Mobile Alert System (CMAS) on an acceptable cell. The second service level, normal service, enables public use on a suitable cell. The third service level, operator service, is for operators only on a reserved cell.

As apparent from the foregoing, cells are categorized according to what services they offer. Mentioned above are "suitable cell", "reserved cell", and "acceptable cell". An "acceptable cell" is a cell on which the wireless terminal may camp to obtain limited service (originate emergency calls and receive ETWS and CMAS notifications). Such a cell fulfills a minimum set of requirements to initiate an emergency call and to receive ETWS and CMAS notification in an E-UTRAN network. A "suitable cell" is a cell on which the wireless terminal may camp on to obtain normal service. The UE shall have a valid USIM and such a cell shall fulfill certain specified requirements. A cell is a "reserved cell" if it is indicated as reserved in system information.

On request of a Non-Access Stratum (NAS) a search is performed for available PLMNs. In so doing, the wireless terminal scans all radio frequency (RF) channels in the E-UTRA bands according to its capabilities to find available PLMNs. On each carrier the wireless terminal searches for the strongest cell and reads its system information, in order to find out to which PLMN(s) the cell belongs. If the wireless terminal can read one or several PLMN identities in the strongest cell, each found PLMN is reported to the NAS as a high quality PLMN (but without the RSRP value), provided that the certain quality criterion is fulfilled. Found PLMNs that do not satisfy the high quality criterion, but for which the wireless terminal has been able to read the PLMN identities, are reported to the NAS together with the RSRP value. Once the wireless terminal has selected a PLMN, the cell selection procedure is performed in order to select a suitable cell of that PLMN to camp on.

In a cell selection and re-selection procedure the wireless terminal performs certain specified measurements. The NAS can control the RAT(s) in which the cell selection is performed, for instance by indicating RAT(s) associated with the selected PLMN, and by maintaining a list of forbidden registration area(s) and a list of equivalent PLMNs. The wireless terminal selects a suitable cell based on idle mode measurements and cell selection criteria. When camped on a cell, the wireless terminal regularly searches for a better cell according to the cell reselection criteria. If a better cell is found, that cell is selected. The change of cell may imply a change of RAT.

Figure 6:
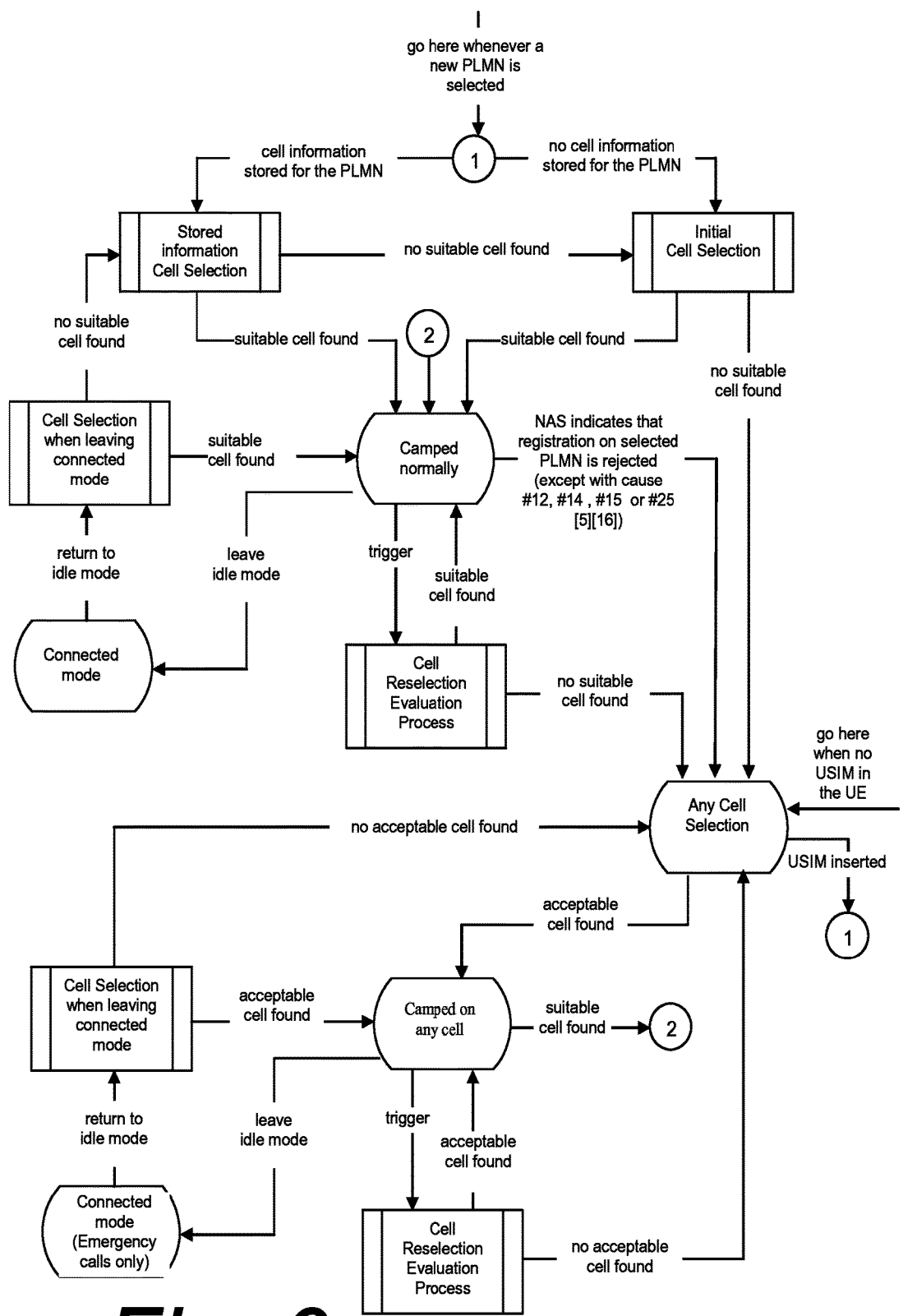
FIG. 6 shows transitions and logic of RRC Idle.

Thus, the wireless terminal may transition through the three previously mentioned states in conjunction with the Idle Mode. Through cell selection/reselection, a wireless terminal in Idle Mode moves to Camped Normally state if the wireless terminal finds a suitable cell (selected PLMN is available) to camp on without registration rejection. Otherwise, the wireless terminal moves to Any Cell Selection state. The wireless terminal moves to Camped on Any Cell state if the wireless terminal finds an acceptable cell (selected PLMN is unavailable) to camp on. If no acceptable cell is found, the wireless terminal stays in Any Cell Selection state. If the wireless terminal in Camped on Any Cell state finds a suitable cell to camp on, the wireless terminal moves to "Camped Normally" directly. These transitions, among other aspects of Idle Mode, are illustrated in FIG. 6, which is reproduced from 3GPP TS 36.304 V8.2.0 (2008-05) section 5.2.2., incorporated herein by reference in its entirety.

A. Network, Node, and Device Overview

FIG. 1A shows an example communications system 20 wherein radio access node 22 communicates over air or radio interface 24 with first wireless terminal $26_1$. The node 22 comprises node processor 30 and node transmitter 32. The first wireless terminal $26_1$ comprises terminal processor 40 and terminal transceiver 42. The terminal transceiver 42 typically comprises terminal transmitter circuitry 44 and terminal receiver circuitry 46.

In general operation node 22 and first wireless terminal $26_1$ communicate with each other across radio interface 24, and may do so using "frames" of information that are typically formatted and prepared by a scheduler of node 22. In Long Term Evolution (LTE) a frame, which may have both downlink portion(s) and uplink portion(s), is communicated between the node and the wireless terminal Each LTE frame may comprise plural subframes. In the time domain, each LTE subframe may be divided into two slots. The transmitted signal in each slot is described by a resource grid comprised of resource elements (RE).

Long Term Evolution (LTE) defines a number of downlink physical channels which carry information received from Medium Access Control (MAC) and higher layers. In Long Term Evolution (LTE) no dedicated data channels are used, instead shared channel resources are used in both downlink and uplink. For example, the Physical Downlink Shared Channel (PDSCH) is the main physical channel used for unicast data transmission, and is also used for transmission of paging information. These shared resources are controlled by one or more schedulers that assign(s) different parts of the downlink and uplink shared channels to different wireless terminals for reception and transmission respectively. The assignments for the shared channels are transmitted in a control region which is provided in the beginning of each downlink subframe. The Physical Downlink Control Channel (PDCCH) carries the resource assignment for wireless terminals.

When a wireless terminal desires to send information on the uplink to the node 22, the wireless terminal sends a scheduling request to the node 22 followed by a buffer status report (BSR) from which the node 22 can determine that the wireless terminal intends to perform an uplink transmission. Thereafter in a downlink (DL) subframe the node 22 indicates on the Physical Downlink Control Channel (PDCCH) what radio resources the wireless terminal may use for its desired uplink transmission, e.g., the node 22 provides an uplink grant for an uplink transmission.

As mentioned above, in some instances wireless terminals may communicate with one another without having those communications transmitted through the node 22. Such terminal-to-terminal communications are also called device-to-device (D2D) communications. At some times the device-to-device (D2D) communications may be under network control or "in-coverage", meaning that one or more of the wireless terminal involved in the device-to-device (D2D) communications may be within range of radio frequencies utilized by a node or cell of a radio access network (RAN). When "in-coverage" care must be taken that use of radio resources of the device-to-device (D2D) communications not cause interference with the other types of communications on-going in the cell, e.g., communications between the node 22 and the wireless terminals served by the node 22.

The terminal transceiver 42 preferably comprises terminal transmitter circuitry ("transmitter") 44 and terminal receiver circuitry ("receiver") 46. The receiver 46 of first wireless terminal $26_1$ receives subframe S communicated over radio interface 24 from communications system 20. When in-coverage, in conjunction with device-to-device (D2D) communications the terminal processor 40 may obtain a device-to-device (D2D) grant from the subframe S. The device-to-device (D2D) grant specifies radio resources that first wireless terminal $26_1$ is permitted to use for device-to-device (D2D) communication with another wireless terminal, e.g., second wireless terminal $26_2$. The transmitter 44 of first wireless terminal $26_1$ serves, e.g., to transmit data on the uplink (UL) from first wireless terminal $26_1$ to node 22, but may also serve to transmit device-to-device (D2D) data to another wireless terminal(s), e.g., second wireless terminal $26_2$, using the radio resources permitted by the D2D grant.

There are two modes of device-to-device (D2D) resource allocation. A first mode has several names (all used interchangeably herein), such as "Mode 1", the "eNB scheduled resource allocation mode", and the "network-allocated resource mode". Mode 1 is characterized by: (1) the wireless terminal needing to be RRC_CONNECTED in order to transmit data; (2) the wireless terminal requesting transmission resources from the node (the node schedules transmission resources for transmission of scheduling assignment(s) and data); (3) the wireless terminal sending a scheduling request (D-SR or Random Access) to the node followed by a buffer status report (BSR). Based on the BSR the node can determine that the wireless terminal has data for a ProSe Direct Communication transmission and estimate the resources needed for transmission.

A second mode also has several names (used interchangeably herein), such as "Mode 2", the "wireless terminal selected resource" mode (or, more simply, the "terminal selected resource mode), and the "wireless terminal (UE) autonomous resource selection mode". Mode 2 is characterized by the wireless terminal (UE) on its own selecting resources from resource pools to transmit scheduling assignment and data. The fact that a wireless terminal selects resources "on its own" indicates that the resource selection is "autonomous".

One of the aspects of the technology disclosed herein provides, e.g., techniques for determining when a wireless terminal such as wireless terminal $26_1$ is out-of-coverage. When out-of-coverage, the wireless terminal $26_1$ is no longer entitled for device-to-device (D2D) communications to use the network radio resources which are dynamically allocated by node 22. That is, when out-of-coverage the wireless terminal may not use Mode 1. Instead, when out-of-coverage, the wireless terminal $26_1$ must use for device-to-device (D2D) communications (e.g., communications with other wireless terminals such as second wireless terminal $26_2$) resources selected by the wireless terminal from a pre-configured pool of radio resources (e.g., a wireless terminal selected resource mode). That is, when out-of-coverage the wireless terminal uses Mode 2. FIG. 1A shows terminal processor 40 having access to device-to-device (D2D) resource pool 48, which may at least partially be stored in memory for access by terminal processor 40.

FIG. 1A also shows the wireless terminal $26_1$ as comprising device-to-device (D2D) controller 50. The device-to-device (D2D) controller 50 performs functions for many embodiments and modes described herein. The device-to-device (D2D) controller 50 and indeed may wireless terminal $26_1$ comprise electronic machinery as described herein with reference to FIG. 5, for example. Among the functions performed by device-to-device (D2D) controller 50 are (B) Cell Selection/Re-Selection strategies; (C) determining out-of-coverage situations; (D) determining conditions applicable for the D2D modes; (E) receiving an indication from node 22 of the particular D2D mode for which the wireless terminal is authorized to operate; (F) determining to use D2D Mode 2 upon occurrence of a physical layer problem; and (G) multi-carrier communications and resource allocation therefor. While one or more of these functions may be performed together in a same example embodiment and mode, each function may also be separately performed without necessarily implementing or involving aspects of other functions.

B. Cell Selection/Re-Selection Strategies

Figure 1B:
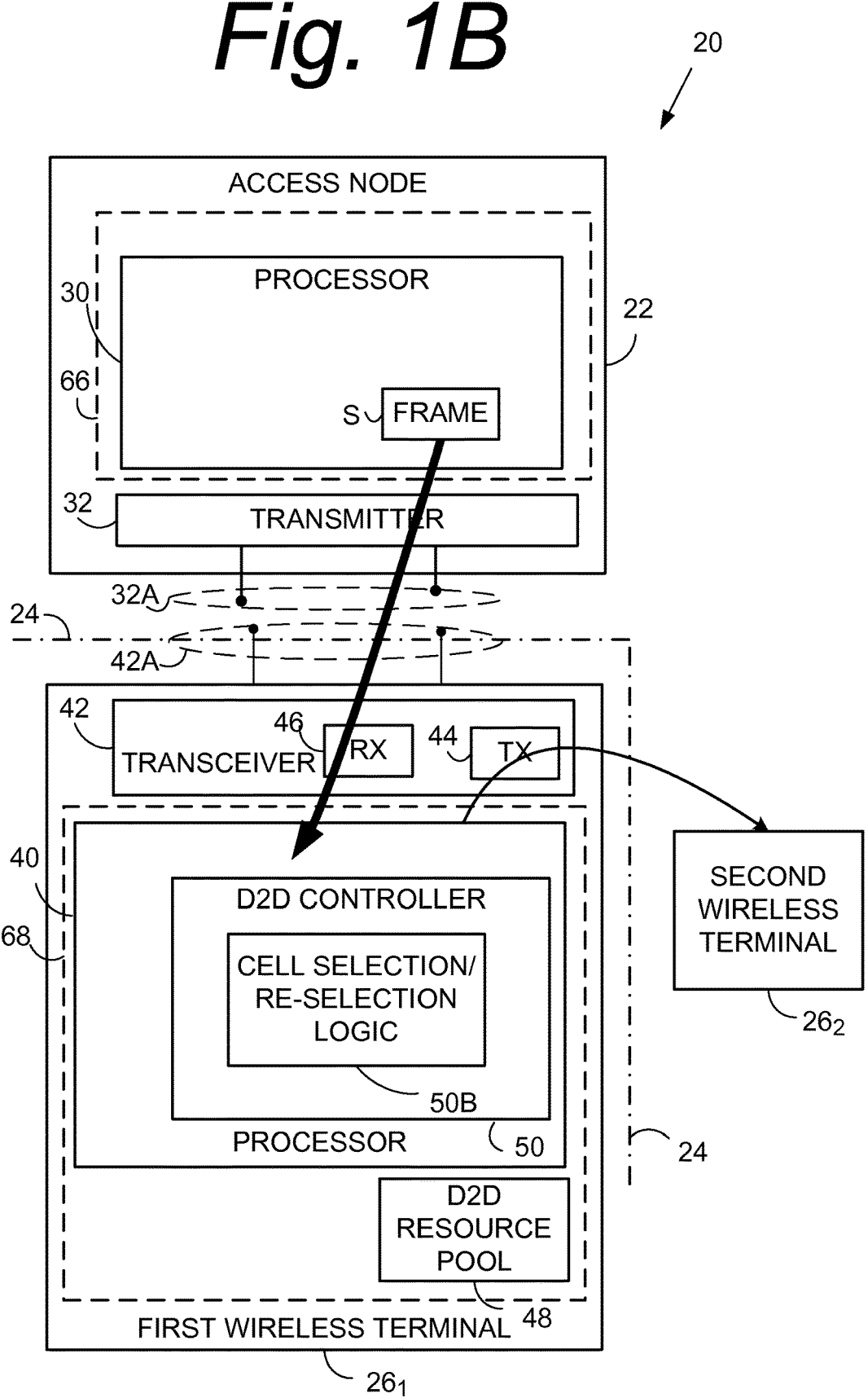
Figure 2:
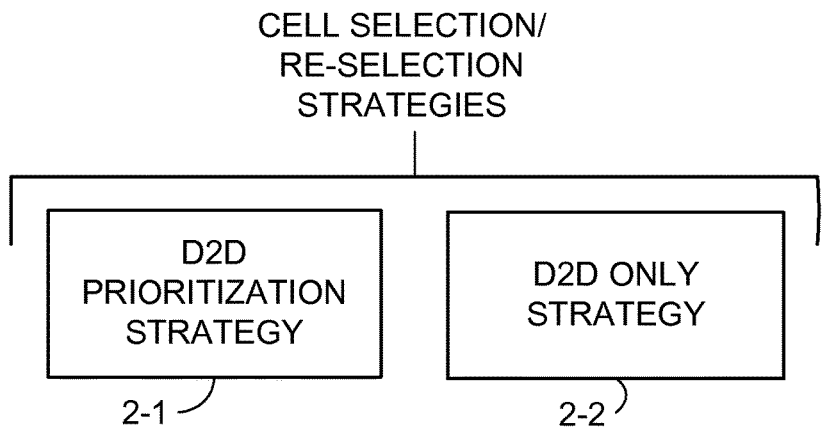
FIG. 2 is a diagrammatic view depicting different types of cell selection/re-selection strategies which may be utilized in conjunction with example out-of-coverage detection methods.

FIG. 1B shows that the device-to-device (D2D) controller 50 of wireless terminal 26₁ may, in an embodiment and mode, comprise cell selection/re-selection logic 50B. FIG. 2 shows basic, example acts or steps involved in a generic method of operating a wireless terminal engaged in device-to-device (D2D) communications, and particularly different types of cell selection/re-selection strategies which may be utilized in conjunction with the example out-of-coverage detection methods. In an example embodiment and mode the acts of FIG. 2 may be performed by cell selection/re-selection logic 50B of device-to-device (D2D) controller 50

One such cell selection/re-selection, represented by act 2-1 and known as the D2D prioritized strategy, requires the wireless terminal to consider selection/reselection candidate frequencies at which the wireless terminal cannot receive or transmit device-to-device (D2D) signals to be of low priority candidate frequencies when the wireless terminal is capable of device-to-device (D2D) communications and is receiving or transmitting, or anticipating receiving or transmitting, device-to-device (D2D) signals on device-to-device (D2D) supported frequencies. It will be appreciated that, as just-stated, the wireless terminal is receiving or transmitting, or anticipating receiving or transmitting, device-to-device (D2D) signals on device-to-device (D2D) supported frequencies, and as a result of such actual or anticipated receiving or transmitting the wireless terminal is therefore "camped" on a particular frequency and is receiving the "camped on" frequencies through its receiver circuit 46. As such, if the candidate frequencies at which the wireless terminal cannot receive or transmit device-to-device (D2D) signals are considered in the D2D prioritized strategy of act 2-1 to be low priority candidate frequencies as just stated, then naturally the candidate frequencies at which the wireless terminal can receive or transmit device-to-device (D2D) signals, including the camped-on frequency, are considered to be high priority candidate frequencies. Logically the already camped-on frequency will be considered to be the highest priority candidate frequency.

Another such cell selection/re-selection strategy, which is a refinement of the strategy of act 2-1, represented by act 2-2 and known as the D2D only strategy, requires the wireless terminal (e.g., wireless terminal 26₁) to consider only cell selection/reselection candidate frequencies which are device-to-device (D2D)-supported frequencies when the wireless terminal is capable of device-to-device (D2D) communications and is receiving or transmitting, or anticipating receiving or transmitting, device-to-device (D2D) signals on device-to-device (D2D) supported frequencies.

It will be appreciated that, as a result of the selection/reselection operation of either act 2-1 or act 2-1, the wireless terminal and particularly terminal processor 40 selects a candidate frequency for use in the device-to-device (D2D) communications. For example, in conjunction with act 2-1 the terminal processor 40 may select a high priority candidate as the candidate frequency for use in the device-to-device (D2D) communications.

In conjunction with the cell selection/re-selection strategy the a transceiver 42 is configured to transmit device-to-device (D2D) signals using device-to-device (D2D) radio resources selected in accordance with the cell selection/reselection operation.

C. Determining Out-of-Coverage Situations

As mentioned above, one of the aspects of the technology disclosed herein provides techniques for determining when a wireless terminal such as wireless terminal 26₁ is out-of-coverage. As shown in more detail in FIG. 1B terminal processor 40 comprises device-to-device (D2D) controller 50 with coverage detection logic 50C and radio resource control (RRC) state machine 52. As explained herein, in one aspect of the technology disclosed herein terminal processor 40 and particularly device-to-device (D2D) controller 50 thereof uses predefined RRC Idle state transitions to determine when a wireless terminal engaged in device-to-device (D2D) communications encounters an out-of-coverage situation (e.g., a wireless terminal selected resource mode).

Figure 3A:
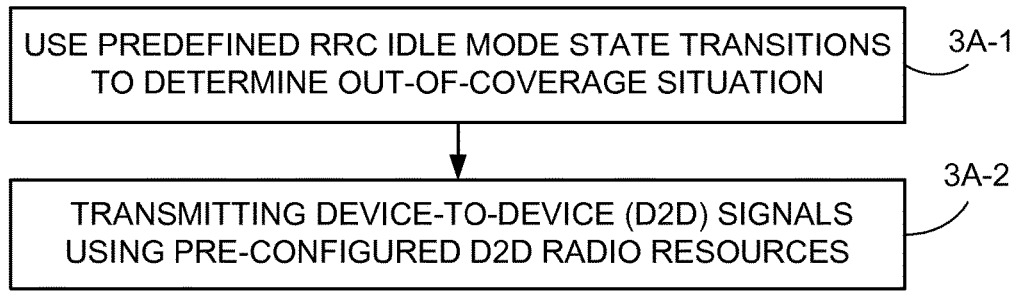
FIG. 3A is a flowchart depicting basic, example acts or steps involved in a generic method of determining when a wireless terminal engaged in device-to-device (D2D) communications encounters an out-of-coverage situation.

FIG. 3A shows basic, example acts or steps involved in a generic method of determining when a wireless terminal encounters an out-of-coverage situation for device-to-device (D2D) communications purposes. "Device-to-device (D2D) communication purposes" (and likewise sidelink direction communication purposes) may comprise a wireless terminal engaged in device-to-device (D2D) communications (e.g., already participating in device-to-device (D2D) communications) or anticipating participating in device-to-device (D2D) communications. The example method of FIG. 3 may be used in conjunction with either the D2D prioritized strategy of act 2-1 or the D2D only strategy of act 2-2. Act 3A-1 comprises the terminal processor 40 using a predefined RRC Idle state transition to determine when a wireless terminal engaged in device-to-device (D2D) communications encounters an out-of-coverage situation. Act 3A-2 comprises, when the out-of-coverage situation is determined, the terminal processor 40 transmitting (over terminal transmitter circuitry 44) device-to-device (D2D) signals using pre-configured resources. For example, act 3A-2 may comprise the terminal processor 40 causing the transmitter 44 of wireless terminal to transmit device-to-device (D2D) signals using resources selected by the wireless terminal from pre-configured device-to-device (D2D) radio resources. As understood from FIG. 1, the pre-configured device-to-device (D2D) resources may, in an example implementation, be the resources of device-to-device (D2D) resource pool 48.

As used herein, the predefined RRC Idle state transition comprises any one of the following: (1) the wireless terminal moving to Any Cell Selection State; (2) the wireless terminal moving to Camped Normally State on non-device-to-device (D2D) frequencies; (3) the wireless terminal moving to Camped on Any Cell State on non-device-to-device (D2D) frequencies. Collectively these three transitions may be referred to as a set of RRC Idle state transitions, any one of which may indicate an out-of-coverage situation.

Figure 3B:
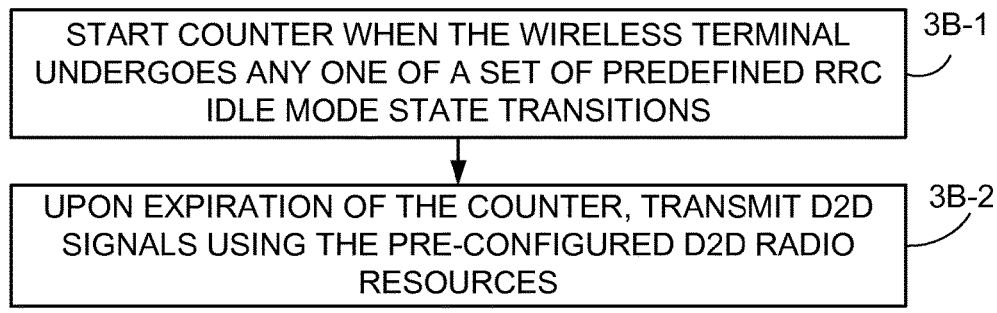
FIG. 3B is a flowchart depicting basic, example acts or steps involved in a counter-based method of determining when a wireless terminal engaged in device-to-device (D2D) communications encounters an out-of-coverage situation.

FIG. 3B shows basic, example acts or steps involved in a counter-based method of determining when a wireless terminal engaged in device-to-device (D2D) communications encounters an out-of-coverage situation (e.g., a wireless terminal selected resource mode). Act 3B-1, which corresponds to an implementation of act 3A-1, comprises the terminal processor 40 starting a resource mode counter 60 (e.g., an out-of-coverage counter) when the wireless terminal undergoes any one of the set of predefined RRC Idle state transitions. FIG. 1C shows that, in an example embodiment and mode, device-to-device (D2D) controller 50 may comprises a counter 60, known as the "out-of-coverage" counter or alternatively as the resource mode counter. In this regard, the device-to-device (D2D) controller 50 of terminal processor 40 requests that RRC state machine 52 notify the device-to-device (D2D) controller 50 when any one of the set of predefined RRC Idle state transitions occurs, and such notification from RRC state machine 52 specifies the nature and/or circumstance of the RRC state transition. Act 3B-2 comprises, upon expiration of the resource mode counter 60, the wireless terminal transmitting (via terminal transmitter circuitry 44) the device-to-device (D2D) signals (e.g., to wireless terminal $26_2$) using the resources selected by the wireless terminal from the pre-configured device-to-device (D2D) radio resources rather than using the network-allocated radio resources scheduled by the node.

Thus, if the resource mode counter 60 expires, the wireless terminal owning the resource mode counter 60 is explicitly declared to be out-of-coverage, e.g., out-of-coverage of device-to-device (D2D) frequencies. When being declared out-of-coverage, the wireless terminal is permitted to perform out-of-coverage operations, e.g., to use the D2D radio resource pool 48 for device-to-device (D2D) communications (but not the device-to-device (D2D) frequencies that are allocated by the node 22 using scheduling and grants). If the wireless terminal is in-coverage, on the other hand, for device-to-device (D2D) communications the wireless terminal is required to obtain device-to-device (D2D) resources/frequencies by scheduling from the node 22 (unless, as described below, the node has provided an indication that wireless terminal may, even when in-coverage, select from the device-to-device (D2D) radio resource pool 48). Obtaining device-to-device (D2D) resources/frequencies by scheduling from the node 22 involves sending a scheduling request to node 22 for device-to-device (D2D) resources, and receiving a scheduling grant from the node 22 in return.

The resource mode counter 60 may be realized as any effective way or apparatus of determining a lapse of time since the wireless terminal was notified by RRC state machine 52 of any one of the set of predefined RRC Idle state transitions. In an example non-limiting implementation, resource mode counter 60 comprises a clock which counts elapsing time units. For example, resource mode counter 60 may be a count-down timer which has an initial value set and then is decremented by the passage of units of time (e.g., seconds). In a situation in which the time initial value is same for each transition of the predetermined set, an example time value may be 10 seconds (see, e.g., http://lteworld.org/forums/lteworld-forum/lte-cell-search, search "period"). In other implementations the resource mode counter 60 may take other forms, such as a circuit or logic configured to count occurrences of detection of a network event or marker. For example, resource mode counter 60 may count or track system frame numbers (SFN).

Thus, an initialization (e.g., "initial") or reference threshold value of resource mode counter 60 may be configurable. The initialization value may be, for example, an integer multiple of wireless terminal cell search periods. A "wireless terminal cell search period" is understood by the person skilled in the art to be a time window allotted for a wireless terminal to search for a cell, such as may occur when the wireless terminal is powered on, for example. Alternatively, the initialization or reference threshold for counter may be multiple attempts of wireless terminal cell search. As yet another alternative implementation, the initialization value of the resource mode counter may be set differently for a first of the predefined RRC Idle state transitions than for a second of the predefined RRC Idle state transitions. For example, the timer threshold of resource mode counter 60 for transition from Camped Normally state to Any Cell Selection State can be set higher than the one with transition from Camped on Any Cell state to Any Cell Selection State.

In the example methods of FIG. 3A and FIG. 3B, preferably the resource mode counter 60 is started on condition that the resource mode counter 60 is not already running and is not already expired. It may be that, under certain circumstances, the resource mode counter 60 is started as a result of a first state transition that appears to indicate out-of-coverage, and following that first state transition a second state transition which also appears to indicate out-of-coverage occurs. In such scenario, detection of the second state transition should not "reset" or "restart" the resource mode counter 60, since the cumulative count after the both the first state transition and the second state transition should be taken into consideration regarding the timing of when an actual out-of-coverage occurs. In such scenario, the terminal processor 40 continues operation of the resource mode counter 60 when the wireless terminal undergoes any one of the set of the predefined RRC Idle state transitions and the resource mode counter is already running.

In an example embodiment and mode the method further comprises at least temporarily stopping the counter if any one of the following occurs: (1) the wireless terminal finds a suitable/acceptable cell to camp on in device-to-device (D2D) supported frequencies; (2) the wireless terminal is no longer participating in device-to-device (D2D) services/communications; (3) the wireless terminal determines that the wireless terminal is out-of-coverage; (4) the wireless terminal determines to use resource(s) selected by the wireless terminal from a pre-configured resource; or (5) the wireless terminal leaves the Idle Mode. In comparison with the wireless terminal determining that it is out-of-coverage, the situation in which the wireless terminal determines to use resource(s) selected by the wireless terminal from a pre-configured resource means that the wireless terminal does not have a transitional procedure of determining it is out-of-coverage when the timer expires, and the wireless terminal may start transmitting D2D signals directly.

D. Node Specifying D2D Mode

Figures 4A, 4B:
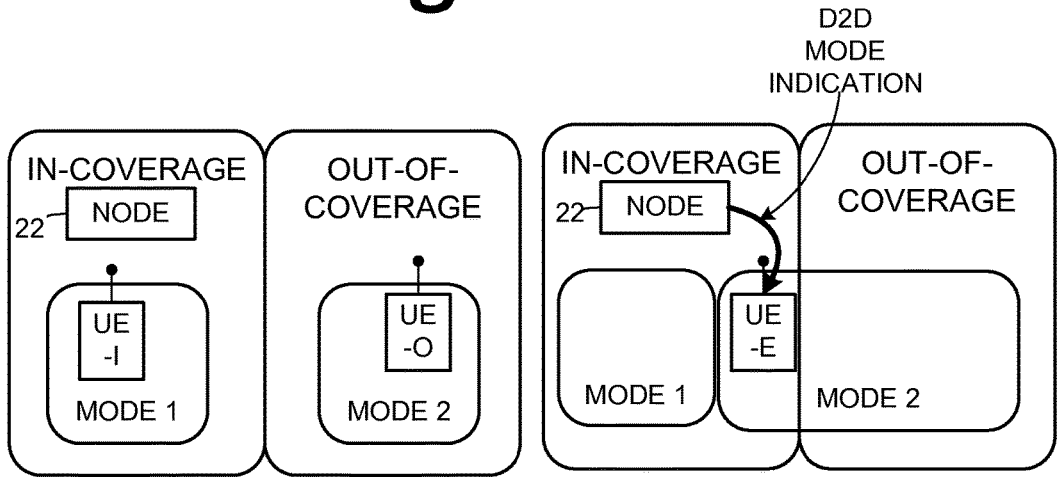
FIG. 4A and FIG. 4B are diagrammatic views showing resources modes for both in-coverage and out-of-coverage situations, with FIG. 4B also showing an exceptional case resource mode according to an example embodiment and mode.

In some example embodiments and modes for device-to-device (D2D) communications when the wireless terminal is in-coverage the wireless terminal may obtain device-to-device (D2D) resources/frequencies (i.e., network-allocated radio resources) by scheduling from the node 22, but if the wireless terminal is out-of-coverage the wireless terminal uses resources/frequencies from a pre-configured pool. Such is illustrated in FIG. 4A in which wireless terminal UE-I is in-coverage of node 22 (and accordingly operates in accordance with Mode 1, using the network-allocated resources scheduled by node 22) but UE-O is out-of-coverage (and thus uses the pre-configured device-to-device (D2D) radio resources).

In other example embodiments and modes the resource mode and coverage-situation may be considered separately. For example, a radio access node 22 may broadcast an indication that the node supports a mode in which the wireless terminal when in-coverage may use resources selected by the wireless terminal from the pre-configured pool of radio resources (e.g., another form of the terminal selected resource mode). For example, if a wireless terminal is in RRC Idle state, the wireless terminal may receive (e.g., at receiver 46), via broadcasted system information, an indication of supporting of a mode using resources selected by the wireless terminal from a pre-configured pool of radio resources. FIG. 1D shows node processor 30 preparing an indication of D2D mode 62 which, as indicated above, may be included in system information (e.g., a system information block) which is understood to be in a subframe S. When the indication of D2D mode 62 indicates that node supports mode using resources selected by the wireless terminal from a pre-configured pool of radio resources, the device-todevice (D2D) controller 50 of the wireless terminal knows in which mode it may operate.

If the wireless terminal receives the indication, the wireless terminal can use the mode using resources selected by the wireless terminal from a pre-configured pool of radio resources until the radio access node instructs the wireless terminal in RRC Connected state to use a mode using network-allocated radio resources scheduled by the radio access node (e.g., network-allocated resource mode). When the wireless terminal is in coverage, the wireless terminal may be required to attempt to access to the radio access node (e.g., performing RRC connection establishment procedure) before and/or during a D2D transmission. When the wireless terminal is in RRC Connected state, the wireless terminal may be instructed by the radio access node to use a mode using network-allocated radio resources scheduled by the radio access node (e.g., network-allocated resource mode). If the wireless terminal received the indication of supporting of a mode using resources selected by the wireless terminal from a pre-configured pool of radio resources, the wireless terminal may not need to use a resource counter. By not sending this indication from the radio access node, the radio access node can protect in-coverage from use of a mode using resources selected by the wireless terminal from a pre-configured pool of radio resources. By sending this indication from the radio access node, the radio access node can provide the wireless terminal an allowance to use the mode using resources selected by the wireless terminal from a pre-configured pool of radio resources.

Thus, it is understood from the foregoing that the node 22 may, in an example embodiment and mode, send to the wireless terminal an indication which specifies, for device-to-device (D2D) communications with another wireless terminal, whether the wireless terminal is to use network-allocated radio resources or radio resources which are selected by the wireless terminal. For example, the node processor 30 may send to the wireless terminal an indication which specifies that the wireless terminal when in network coverage is use radio resources which are selected by the wireless terminal for device-to-device (D2D) communications with the another wireless terminal.

If the wireless terminal can determine or infer from the indication of D2D mode that the wireless terminal is to use network-allocated radio resources, then the node and the wireless terminal operate in a manner as already described. That is, the node 22 receives a scheduling request from the wireless terminal when the wireless terminal desires to send a device-to-device (D2D) communication. Then, in response to the scheduling request, the node 22 sends a grant of the network-allocated radio resources to the wireless terminal in a subframe.

As shown in FIG. 1D, the transmitter 32 (transmitter circuitry) of the node 22, along with receiver 34 (receiver circuitry), comprise a node transceiver 36. Although the transceiver 36 is shown only in FIG. 1D, it should be appreciated that the nodes of other example embodiments and modes described herein may also have such a transceiver. In conjunction with the operation of the example embodiment of FIG. 1D, transmitter 32 transmits the indication 62 over the radio interface to the wireless terminal, and receiver 34 is configured to receive a scheduling request from the wireless terminal.

One instance in which the node 22 may send the wireless terminal an indication to use the radio resources which are selected by the wireless terminal occurs when the wireless terminal is in a radio resource control (RRC) Idle state. Another instance in which the node may send the wireless terminal an indication to use the network-allocated radio resources occurs when the wireless terminal is in a radio resource control (RRC) Connected state.

Thus far the pool 48 of radio resources has been described as "pre-configured" and thus the radio resources thereof are available for selection by the wireless terminal in what has been termed a wireless terminal selected resource mode. Some of the radio resources of pool 48 may be pre-configured in the sense that radio resources are pre-configured in memory without interaction of the node 22, e.g., preconfigured from an electronic device such as a card (e.g., SIM card or UICC card) installed in the wireless terminal, or from some other circuit entity such as Mobile Equipment (ME). Other radio resources of pool 48 may be pre-configured in the sense that radio resources are pre-configured in memory on the basis of information received from the node 22. However the wireless terminal learns of or obtains the pre-configured resources, it is understood from the foregoing that the node 22 sends to the wireless terminal an indication (e.g., indication of D2D mode 62) of whether the wireless terminal is to use mode 1 resources (e.g., network-allocated resource mode) or mode 2 resources (pre-configured resources from which the wireless terminal makes a resource selection). For example, it was mentioned above that the wireless terminal may receive, via broadcasted system information, an indication of supporting of a mode using resources selected by the wireless terminal from a pre-configured pool of radio resources, or that the wireless terminal may be instructed by the radio access node to use a mode of network-allocated radio resources scheduled by the radio access node (e.g., network-allocated resource mode).

As was mentioned above, in FIG. 4A wireless terminal UE-I is in-coverage of node 22 (and accordingly operates in accordance with Mode 1, using the network-allocated resources scheduled by node 22) but UE-O is out-of-coverage and thus uses the pre-configured device-to-device (D2D) radio resources. But in another aspect of the technology disclosed herein, illustrated in FIG. 4B, the resource mode and coverage-situation may be considered separately as also described above. For example, a radio access node 22 may broadcast an indication that the node supports a mode in which the wireless terminal UE-E when in-coverage may use resources selected by the wireless terminal from a pre-configured pool of radio resources (e.g., as in the terminal selected resource mode).

E. Conditions for D2D Modes

For the UE with single RF configuration, according to the agreements of 3GPP TSG RAN WG2 Meeting #85-bis and the related change request R2-141859, the ProSe-enabled wireless terminal can operate in two modes for resource allocation: Mode 1 and Mode 2. Thus, as understood from the foregoing a wireless terminal is considered in-coverage if it has a serving cell (i.e., the wireless terminal is RRC_CONNECTED or is camping on a cell in RRC_IDLE). If a wireless terminal is out of coverage it can only use Mode 2. If the wireless terminal is in coverage it shall use only the mode indicated by the node's grant configuration unless one of the exceptional cases occurs. When an exceptional case occurs the wireless terminal is allowed to use Mode 2 at least temporarily even though it was configured to use Mode 1.

Much of the above discussion and cited agreements are applicable for the case of a D2D wireless terminal with single RF configuration, where D2D service and WAN service share the same carrier frequency. Mode 1 resource allocation method 1 may cause a "coverage hole" or service discontinuity in coverage when the wireless terminal still camps on a cell but cannot have successful RRC connection with eNodeB, or when the wireless terminal encounters exceptional radio link problems. The Mode 2 resource allocation method may generate interference to the network if synchronization errors occur, which will destroy the network. Meanwhile, the issue of load balancing should also be considered for in coverage scenario when one resource allocation method cannot have adequate resource for allocation while the other still has enough resource.

In order to balance the effects of these factors and to configure a network to get better control, resource allocation methods are described below for a certain carrier frequency. These procedures and techniques may or may not be limited to single RF capable wireless terminal or to a wireless terminal capable of D2D communication or Public Safety wireless terminal.

As used herein "single RF" refers to a wireless terminal having one transceiver, e.g., one transmitting circuit and one receiving circuit for handling one baseband. By contrast, multiple RF or the like refers to a wireless terminal having plural transceivers, e.g., plural transmitting circuits and plural receiving circuits for handling respective plural basebands.

Discussion is provided above and below regarding particular radio resources that can be used for device-to-device (D2D) Mode 1 and device-to-device (D2D) Mode 2. A brief review of each device-to-device (D2D) mode is provided below:

Mode 1 (eNB scheduled resource allocation) is characterized by:
  The wireless terminal needing to be RRC_CONNECTED in order to transmit data.
  The wireless terminal requesting transmission resources from the node (the node schedules transmission resources for transmission of scheduling assignment(s) and data.
  The wireless terminal sending a scheduling request (D-SR or Random Access) to the node followed by a buffer status report (BSR). Based on the BSR the node can determine that the wireless terminal has data for a ProSe Direct Communication transmission and estimate the resources needed for transmission.

Mode 2 (UE autonomous resource selection) is characterized by the wireless terminal on its own selects resources from resource pools to transmit scheduling assignment and data.

Figure 1E:
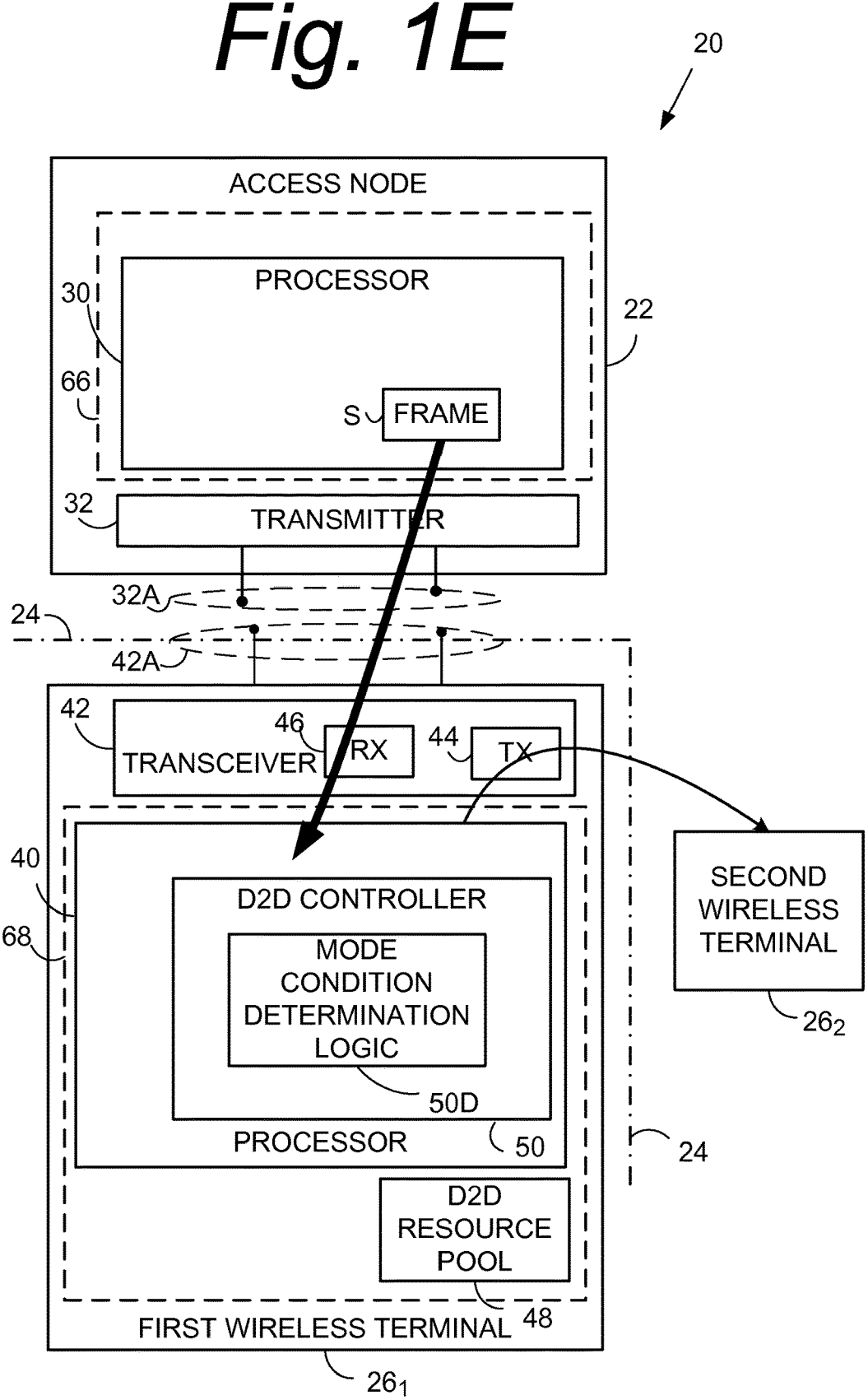

Now discussed are conditions in which D2D Mode 1 and D2D Mode 2 apply. Whether one or more of the Mode 1 satisfying conditions or the D2D Mode 2 satisfying conditions applies or is in effect may be determined by Mode Condition Determination Logic 50D of device-to-device (D2D) controller 50, as shown in FIG. 1E.

If the wireless terminal is capable of D2D communications and is interested in transmitting D2D signals in a carrier frequency, the wireless terminal can transmit D2D signals with Mode 1 if it satisfies one or more of the following conditions or combinations thereof:
  Mode 1 Alternative Condition 1: The wireless terminal is in RRC_CONNECTED state and is configured with mode 1 by the eNodeB.
  Mode 1 Alternative Condition 2: the wireless terminal is in RRC_IDLE state and camps on a cell.
  Mode 1 Alternative Condition 3: The wireless terminal has downlink signal strength (e.g., RSRP/RSRQ) higher than some threshold.
  Mode 1 Alternative Condition 4: the node informs the wireless terminal to use mode 1 with dedicated information.
  Mode 1 Alternative Condition 5: the node informs the wireless terminal to that the wireless terminal is allowed to use mode 1 with broadcasted information
  Mode 1 Alternative Condition 6: The node does not inform the wireless terminal to use mode 2 with dedicated information.
  Mode 1 Alternative Condition 7: The node does not inform the wireless terminal that the wireless terminal is allowed use mode 2 with broadcasted information.

If the wireless terminal is capable of D2D communications and is interested in transmitting D2D signals in a carrier frequency, the wireless terminal can transmit D2D signal with Mode 2 if it satisfies one or more of the following conditions or combinations thereof:
  Mode 2 Alternative Condition 1: The wireless terminal is in RRC_IDLE state.
  Mode 2 Alternative Condition 2: The wireless terminal cannot camp on any cell.
  Mode 2 Alternative Condition 3: The wireless terminal has downlink signal strength (e.g., RSRP/RSRQ) lower than some threshold.
  Mode 2 Alternative Condition 4: The wireless terminal meets exceptional radio link problems (e.g., RLF or RRC connection request fails several times when the wireless terminal camps on a cell).
  Mode 2 Alternative Condition 5: The node informs the wireless terminal to use mode 2 with dedicated information.
  Mode 2 Alternative Condition 6: The node informs the wireless terminal to be allowed to use Mode 2 with broadcasted information.
  Mode 2 Alternative Condition 7: the node does not inform the wireless terminal to use mode 1 with dedicated information.
  Mode 2 Alternative Condition 8: The node does not inform the wireless terminal that the wireless terminal is allowed to use mode 1 with broadcasted information.

Thus, it is understood from the foregoing that the wireless terminal and the mode determination logic 50D of device-to-device (D2D) controller 50 in particular may make a determination regarding a type of radio resources that the wireless terminal may use for device-to-device (D2D) communications with another wireless terminal. The determination comprises the wireless terminal making a first mode determination that the wireless terminal should use network-allocated radio resources in accordance with one or more of the Mode 1 Alternative Conditions 1-7; or the wireless terminal making a second mode determination that the wireless terminal should use the wireless terminal autonomous resource selected radio resources in accordance with one or more of the one or more of the Mode 2 Alternative Conditions 1-8.

In an example embodiment and mode the wireless terminal may make the first mode determination that the wireless terminal should use the network-allocated radio resources if the wireless terminal is in a Radio Resource Control (RRC) Connected state and the wireless terminal is permitted by the node to use the network-allocated radio resources.

In an example embodiment and mode the wireless terminal may make the second mode determination that the wireless terminal should use the wireless terminal autonomous resource selected radio resources if the wireless terminal is either in a Radio Recourse Control (RRC) Idle state and the wireless terminal is permitted by the node to use the wireless terminal autonomous resource selected radio resources; or in a Radio Resource Control (RRC) Connected state and the wireless terminal is permitted by the node to use the wireless terminal autonomous resource selected radio resources In an example embodiment and mode the wireless terminal may make the second mode determination that the wireless terminal should use the wireless terminal autonomous resource selected radio resources when the wireless terminal experiences a predetermined radio link problem, such as a radio link failure or repeated failure of a RRC connection request when the wireless terminal camps on a cell.

The transmitter 44 of the wireless terminal transmits device-to-device (D2D) signals to another wireless terminal (e.g., wireless terminal 26$_2$) using the radio resources according to either the first mode determination or the second mode determination.

F. Using D2D Mode 2 for Physical Layer Problems

It was mentioned above in conjunction with Mode 2 Alternative Condition 4 that the wireless terminal may use the D2D Mode 2, e.g., may use the wireless terminal autonomous selected radio resources if the wireless terminal meets exceptional radio link problems (e.g., RLF or RRC connection request fails several times when the wireless terminal camps on a cell). Moreover, it was explained above that a radio link failure (RLF) results from a problem on a physical layer. Therefore it should be understood that in an example embodiment and mode illustrated in FIG. 1F that the wireless terminal and its device-to-device (D2D) controller 50 in particular comprise physical layer problem determination logic 50F. In other words, upon occurrence of a predetermined physical layer condition, the wireless terminal uses at least some wireless terminal autonomous selected device-to-device (D2D) radio resources for device-to-device (D2D) communications with another wireless terminal when the wireless terminal is in coverage of the radio access network.

Figure 1F:
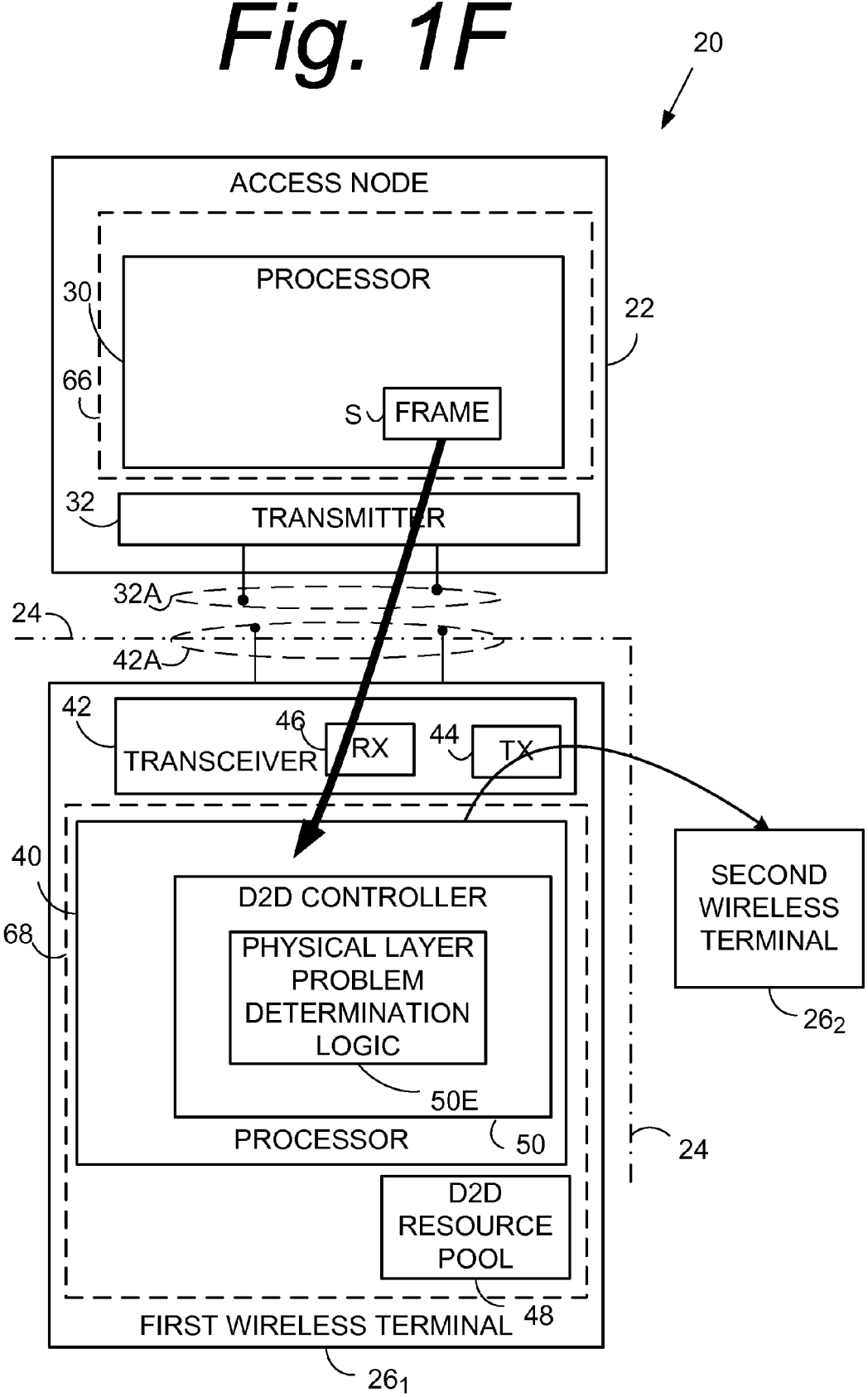

In the example embodiment of FIG. 1F, transmitter 44 is configured to transmit device-to-device (D2D) signals to the another wireless terminal (e.g., wireless terminal 26$_2$) using at least some wireless terminal autonomous selected device-to-device (D2D) radio resources when the wireless terminal is in coverage of the radio access network and the physical layer problem is determined.

In an example embodiment and mode the predetermined physical layer condition comprises a radio link failure.

The method of FIG. 1F may further comprise the wireless terminal obtaining the at least some wireless terminal autonomous selected device-to-device (D2D) radio resources from a pre-configured pool of radio resources stored in a memory of the wireless terminal, e.g., pool 48. In an example implementation, the wireless terminal may use the at least some wireless terminal autonomous selected device-to-device (D2D) radio resources for device-to-device (D2D) communications with the another wireless terminal until the wireless terminal when in a RRC Connected state receives a subsequent instruction to use different radio resources.

G. Multi-Carrier Communications and Resource Allocation Therefor

A wireless terminal may be capable of multi-carrier communications, e.g., capable of sending D2D signals, and as such may operate using a first carrier frequency and at least a second carrier frequency. As used herein, D2D signal includes channels, reference signals and synchronization signals for D2D communication and/or discovery.

Multicarrier communications can be performed by a wireless terminal capable of single RF or a wireless terminal capable of multiple RF. As mentioned above, a wireless terminal capable of single RF (e.g., single radio frequency operation) has one transceiver (one transmitter and one receiver) and thus handles one baseband, but may process more than one carrier frequency with its one transceiver. A wireless terminal capable of multiple RF (e.g., multiple radio frequency operation) comprises multiple transceivers and may handle multiple basebands, with each transceiver possibly processing more than one carrier frequency.

The wireless terminal has to know what radio resources to use for both its wide area network (WAN) communications and its device-to-device (D2D) communications. When a wireless terminal is capable of multi-carrier communications, choice of resource allocation methods becomes more complicated. Two service types, D2D service and wide area network (WAN) service, are considered herein for D2D capable UE multi-carrier communications. Different countries may have different radio spectrum allocation policies. Some countries may allocate dedicated carrier frequency band for public safety usage; other countries may allow the carrier frequency sharing between D2D service and WAN service. Consequently, different spectrum allocation scenarios substantially affect the resource allocation methods. UE therefore uses the different alternative methods according to different scenarios.

According to the technology disclosed herein, an implementation of the method, if the UE in RRC_IDLE is camped in a first carrier frequency or UE in RRC_CONNECTED is served in a serving cell in a first carrier frequency, the UE uses only mode 2 to transmit a D2D signal in a second carrier frequency. However, the wireless terminal (e.g., UE) has to determine whether it can use mode 2 or not based on a certain criteria. As described herein, such criteria may include the capability information of the wireless terminal. The node 22 (e.g., eNodeB) may have stored the capability information for the wireless terminal (e.g., "UE capability information") in a memory of the node 22. Or the wireless terminal may inform the node 22 of its UE capability information related to support of transmitting the D2D signal for each band combination.

A fundamental point of these methods is, for a single wireless terminal no matter how many radio frequency (RF) chains are supported, only one RRC_CONNECTED state is allowed for two reasons: (1) wireless terminal implementation feasibility and complexity; and (2) two RRC_CONNECTED states in one wireless terminal practically means the fact that these are two wireless terminals. A "radio frequency (RF) chain" essentially means how many transceivers the wireless terminal may have, e.g., how many baseband signals can be processed. A wireless terminal that supports two RF chains, for example, is essentially two wireless terminals co-located in one wireless terminal device.

In RRC_CONNECTED state, the wireless terminal may be configured with multiple serving cells. Therefore, "first carrier frequencies" may be used for multiple serving cells, but "a first carrier frequency" may be used for a single serving cell. In RRC_IDLE, the wireless terminal may only camp on a single cell. Therefore, the terminology "first carrier frequency" may herein apply to any or all of the scenarios described in this paragraph.

The first carrier frequency(ies) are a set of carrier frequency(ies) which are used for WAN services for the wireless terminal. The second carrier frequencies are a set of D2D carrier frequency(ies) which are used for D2D services for the wireless terminal. The second carrier frequency(ies) may be D2D dedicated for the wireless terminal. The first carrier frequency(ies) may be shared by D2D and WAN for the wireless terminal. The first carrier frequencies and the second carrier frequencies for the wireless terminal may be the same set or different sets. From a system perspective, one wireless terminal may use a frequency as the first frequency and another may use it as the second frequency. A frequency may be dedicated to D2D from a system perspective.

Because the wireless terminal in RRC_CONNECTED state is served in the first carrier frequency(ies), mode 1 can be configured only in the first carrier frequency (ies).

Figure 7:
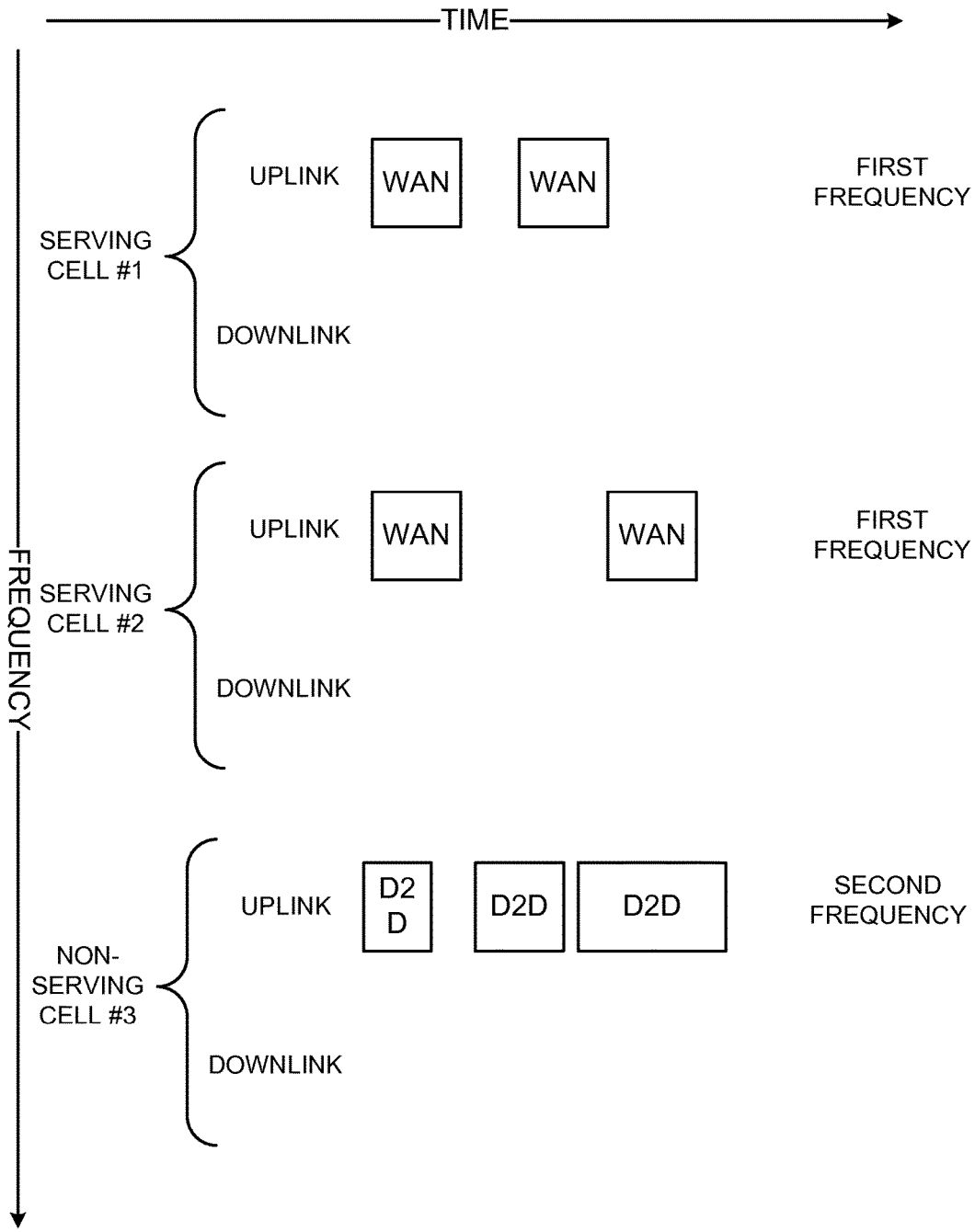
FIG. 7 shows a example of multi-carrier communications transmitting WAN signals in first carrier frequency(ies) and transmitting D2D signals in second carrier frequency(ies), where simultaneous transmission (time overlapping) is supported.
Figure 8:
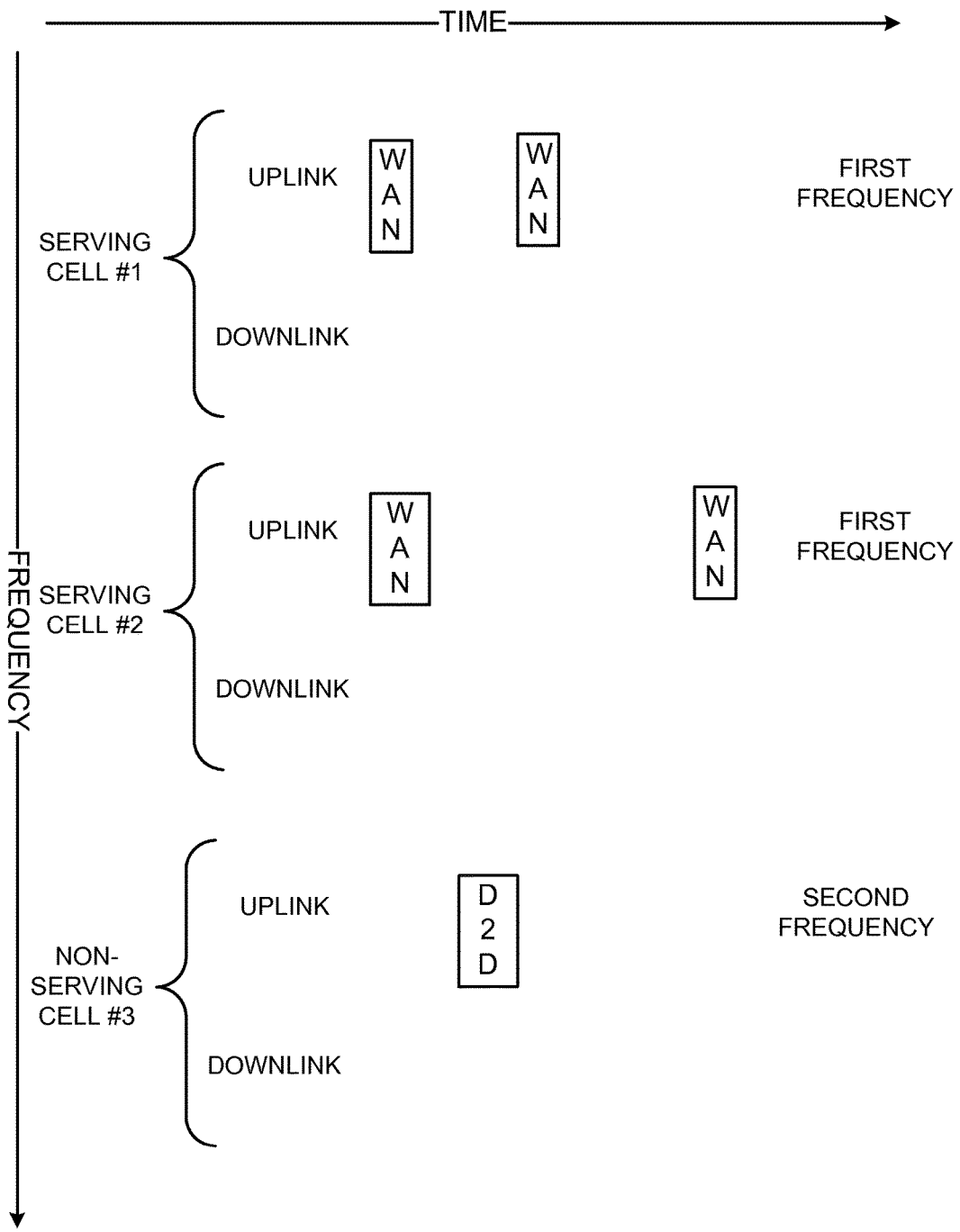
FIG. 8 shows a example of multi-carrier communications transmitting WAN signals in first carrier frequency(ies) and transmitting D2D signals in second carrier frequency(ies), where simultaneous transmission is not supported.
Figure 9:
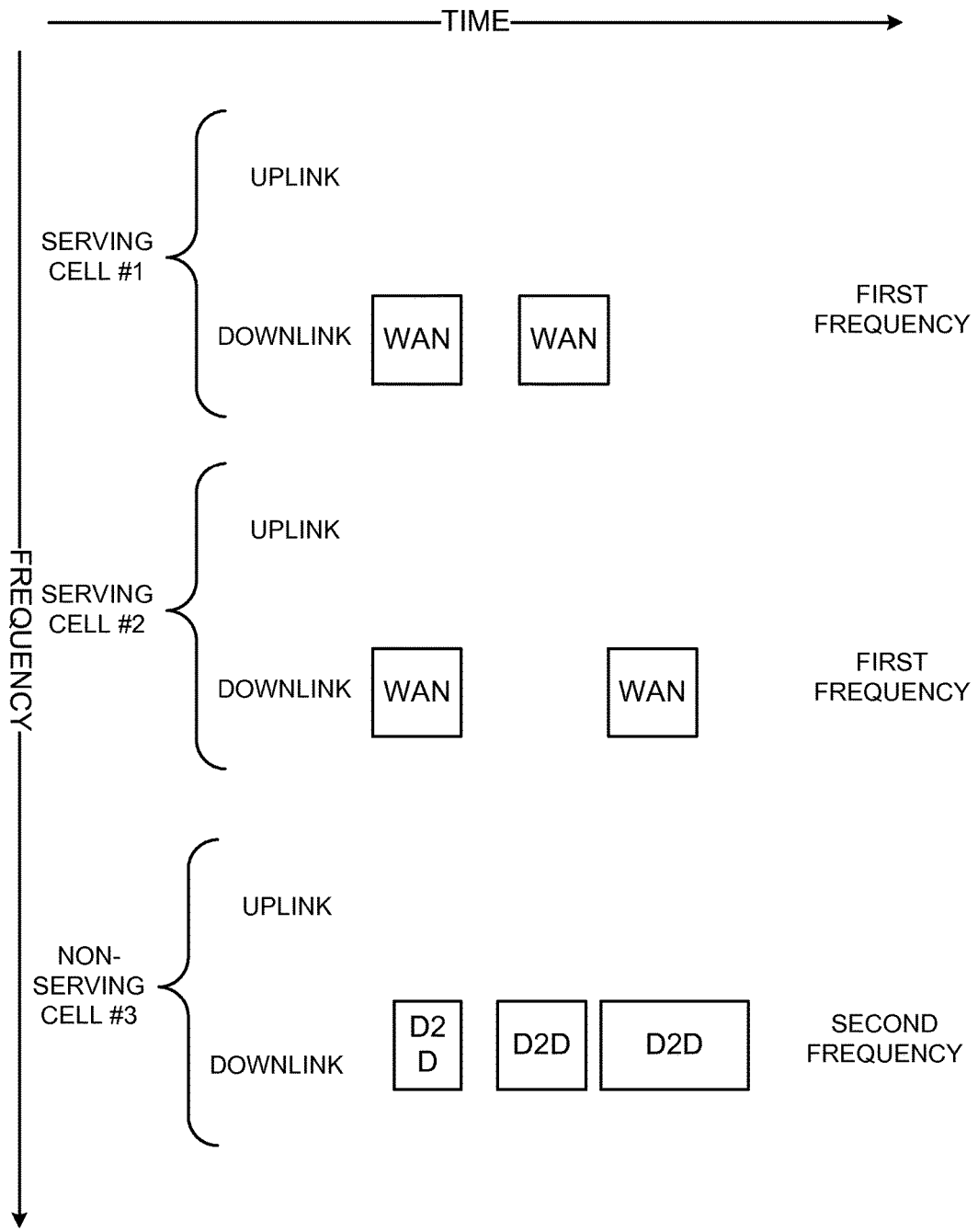
FIG. 9 shows a example of multi-carrier communications receiving WAN signals in first carrier frequency(ies) and transmitting D2D signals in second carrier frequency(ies), where simultaneous transmission (time overlapping) is supported.
Figure 10:
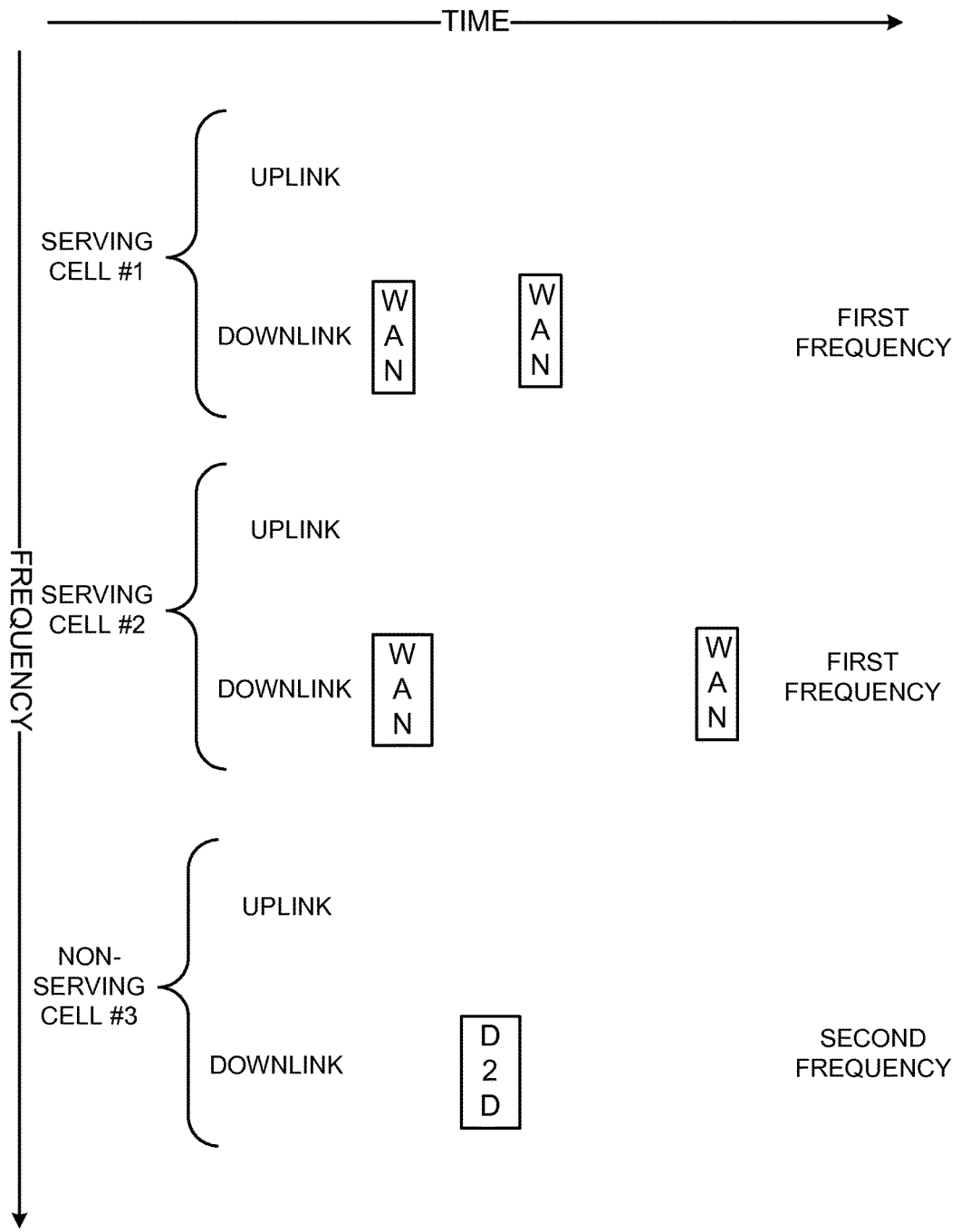
FIG. 10 shows a example of multi-carrier communications receiving WAN signals in first carrier frequency(ies) and transmitting D2D signals in second carrier frequency(ies), where simultaneous transmission is not supported.
Figure 11:
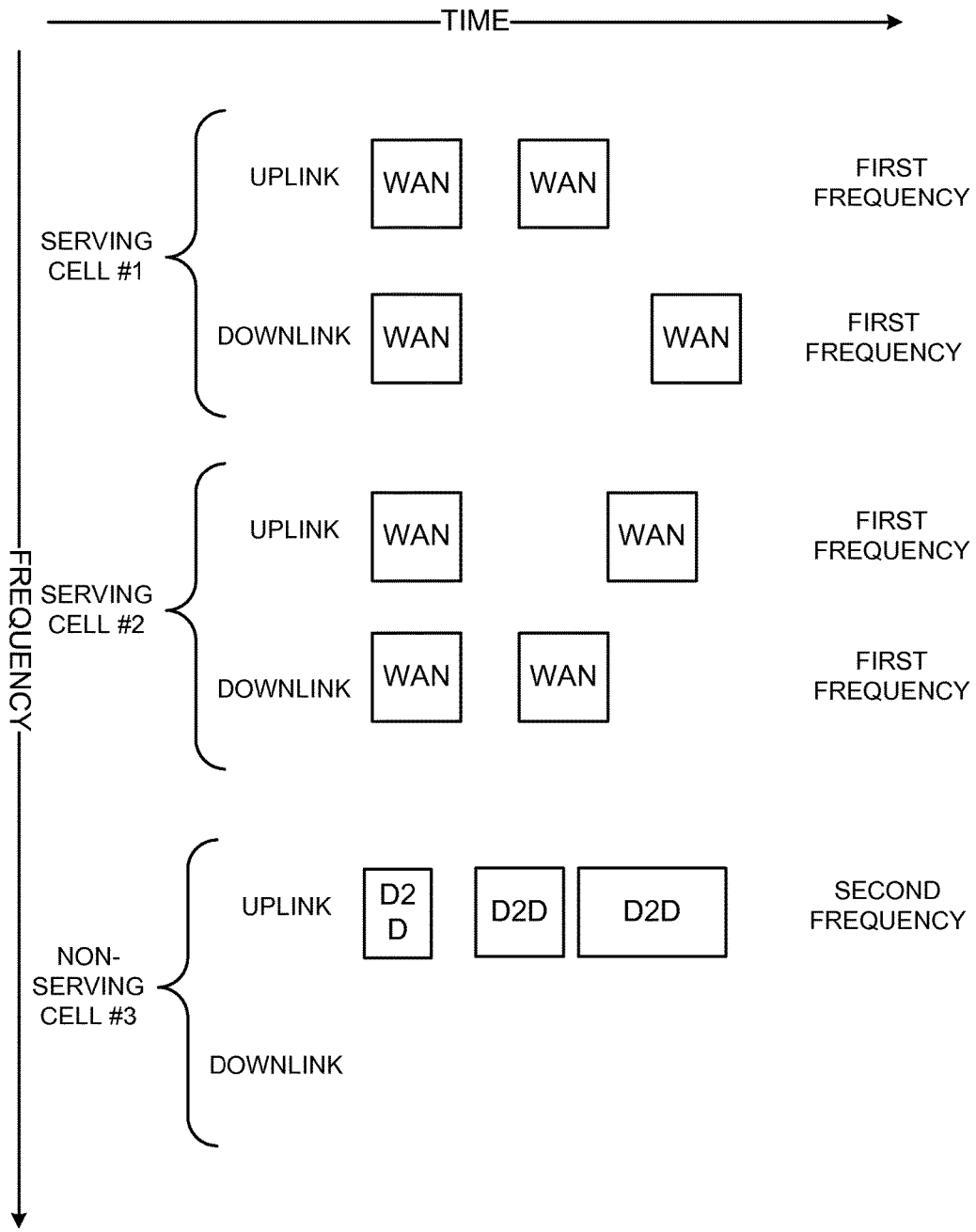
FIG. 11 shows a example of multi-carrier communications receiving and/or transmitting WAN signals in first carrier frequency(ies) and transmitting D2D signals in second carrier frequency(ies), where simultaneous transmission (time overlapping) is supported.
Figure 12:
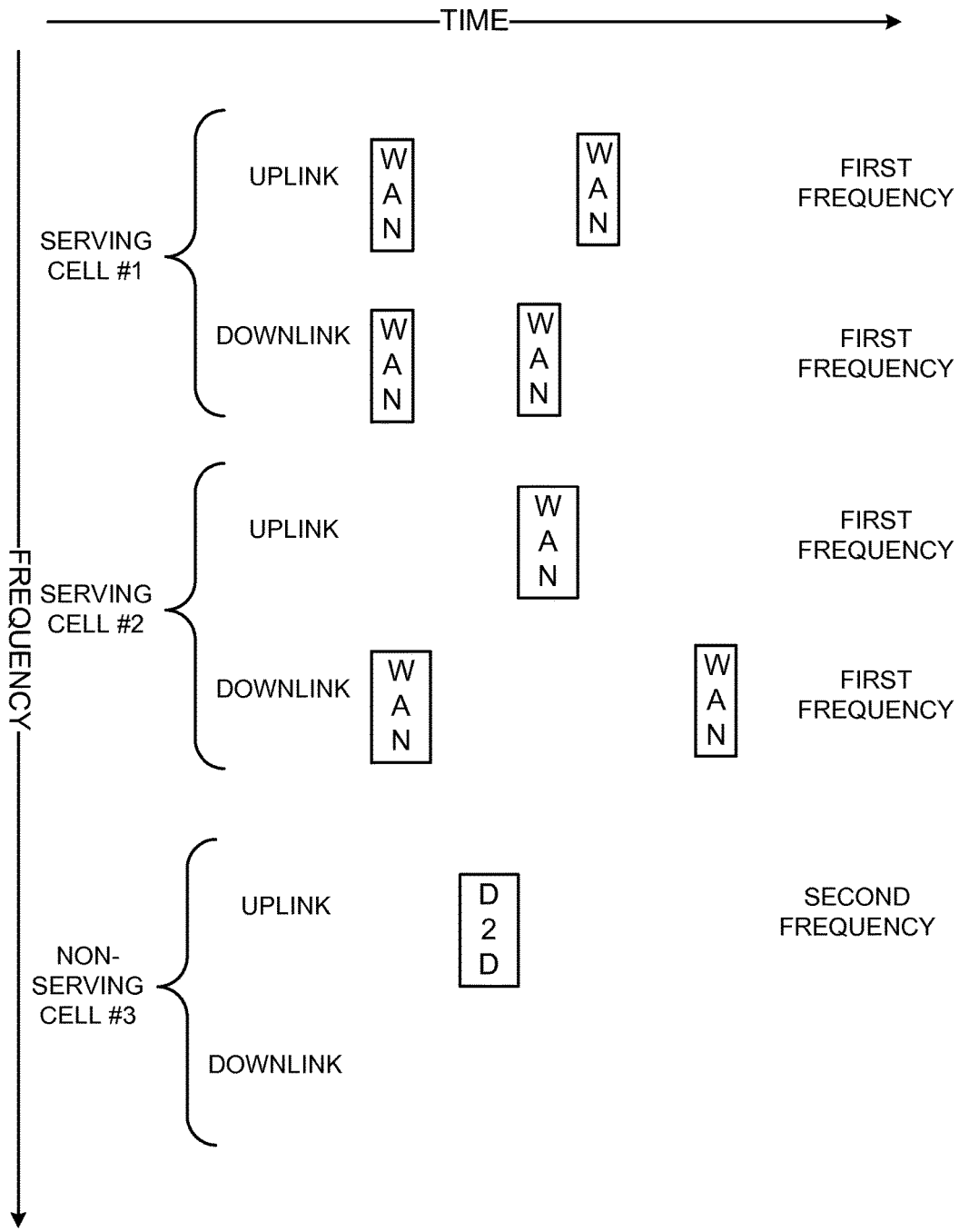
FIG. 12 shows a example of multi-carrier communications receiving and/or transmitting WAN signals in first carrier frequency(ies) and transmitting D2D signals in second carrier frequency(ies), where simultaneous transmission is not supported.
Figure 13:
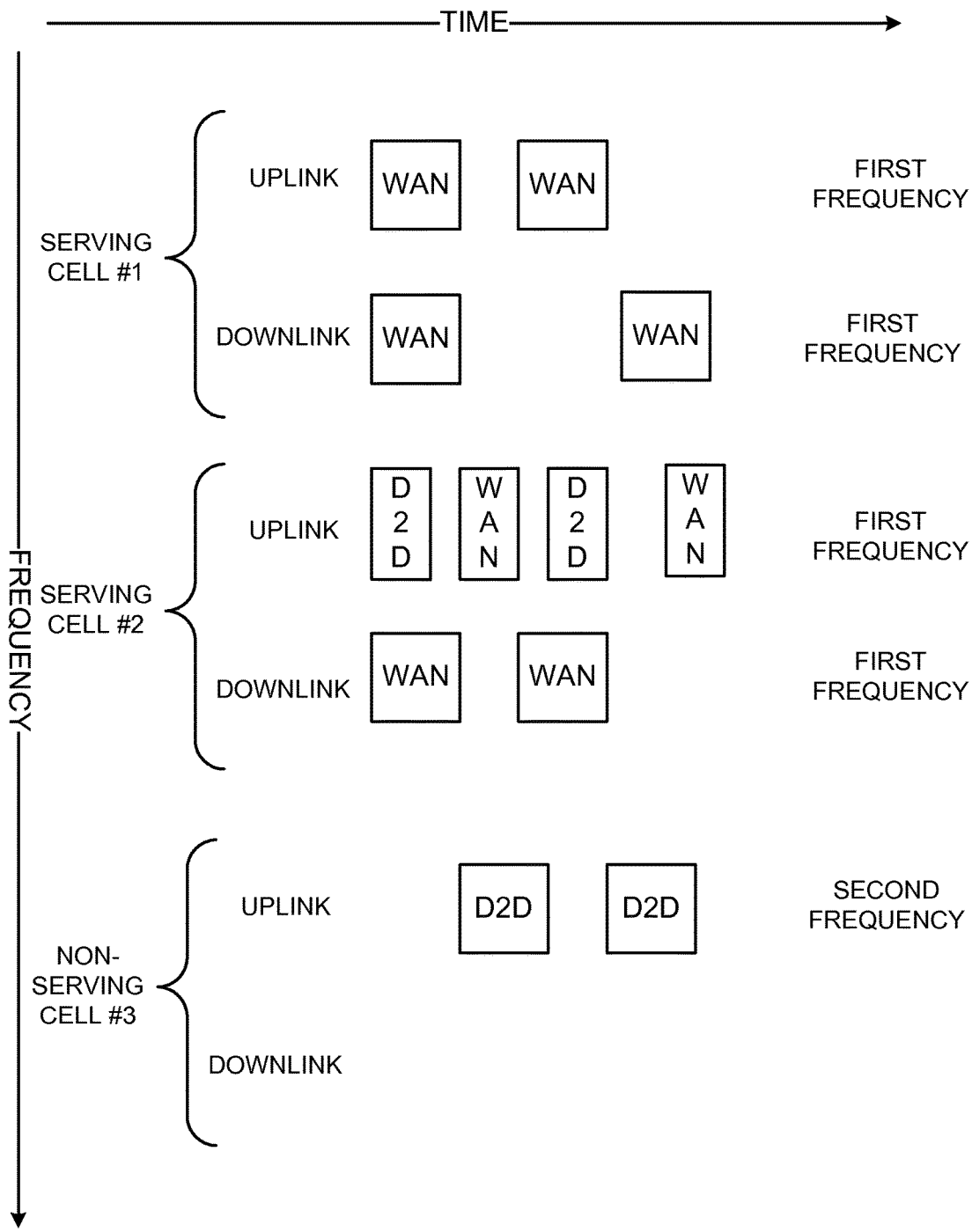
FIG. 13 shows a example of multi-carrier communication receiving and/or transmitting WAN signals in first carrier frequency(ies) and transmitting D2D signals in second carrier frequency(ies), where simultaneous transmission is supported and one of the first frequencies is shared by WAN and D2D.
Figure 14:
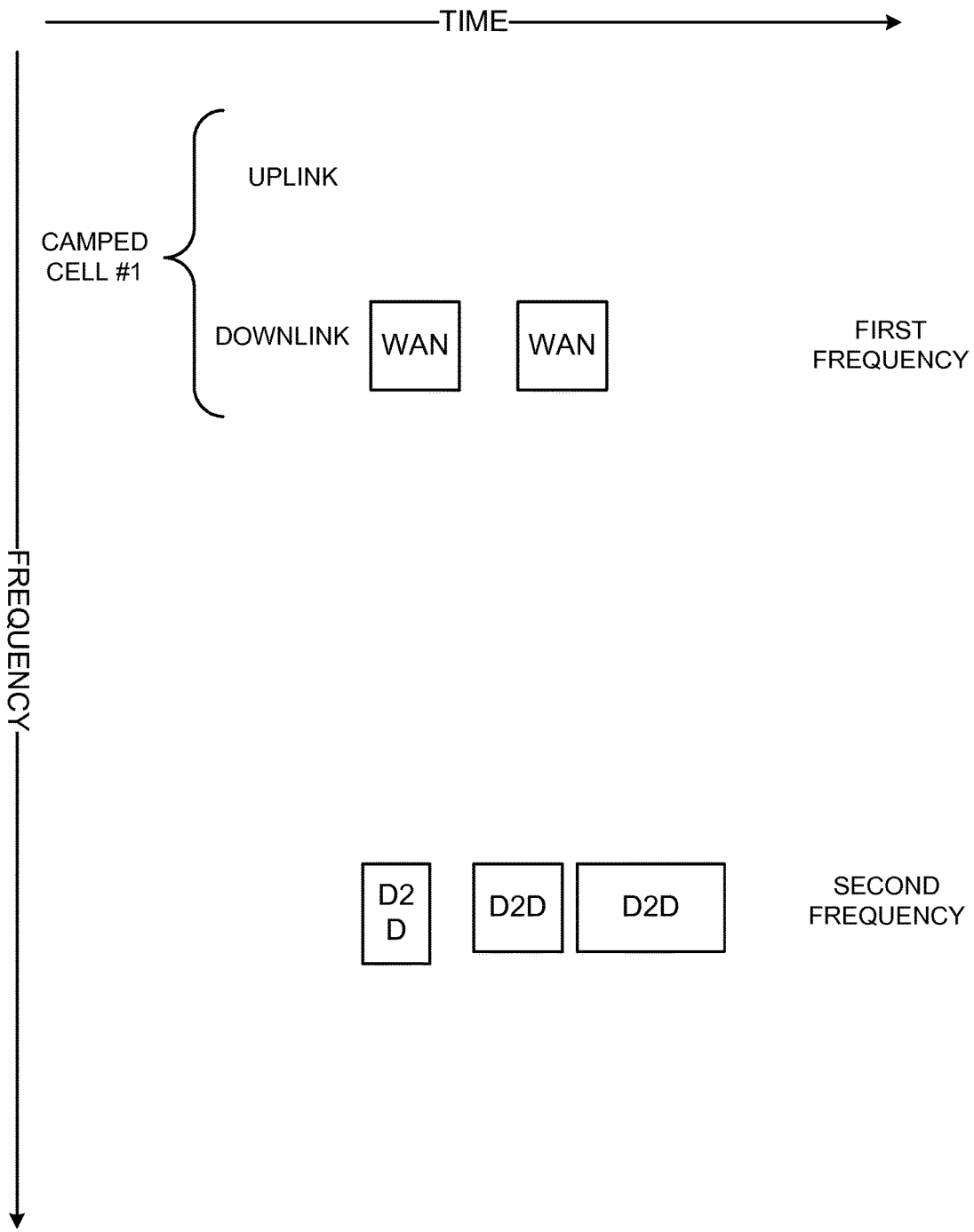
FIG. 14 shows a example of multi-carrier communications for UE in RRC_IDLE receiving WAN signals in first carrier frequency(ies) and transmitting D2D signals in second carrier frequency(ies), where simultaneous transmission (time overlapping) is supported.
Figure 15:
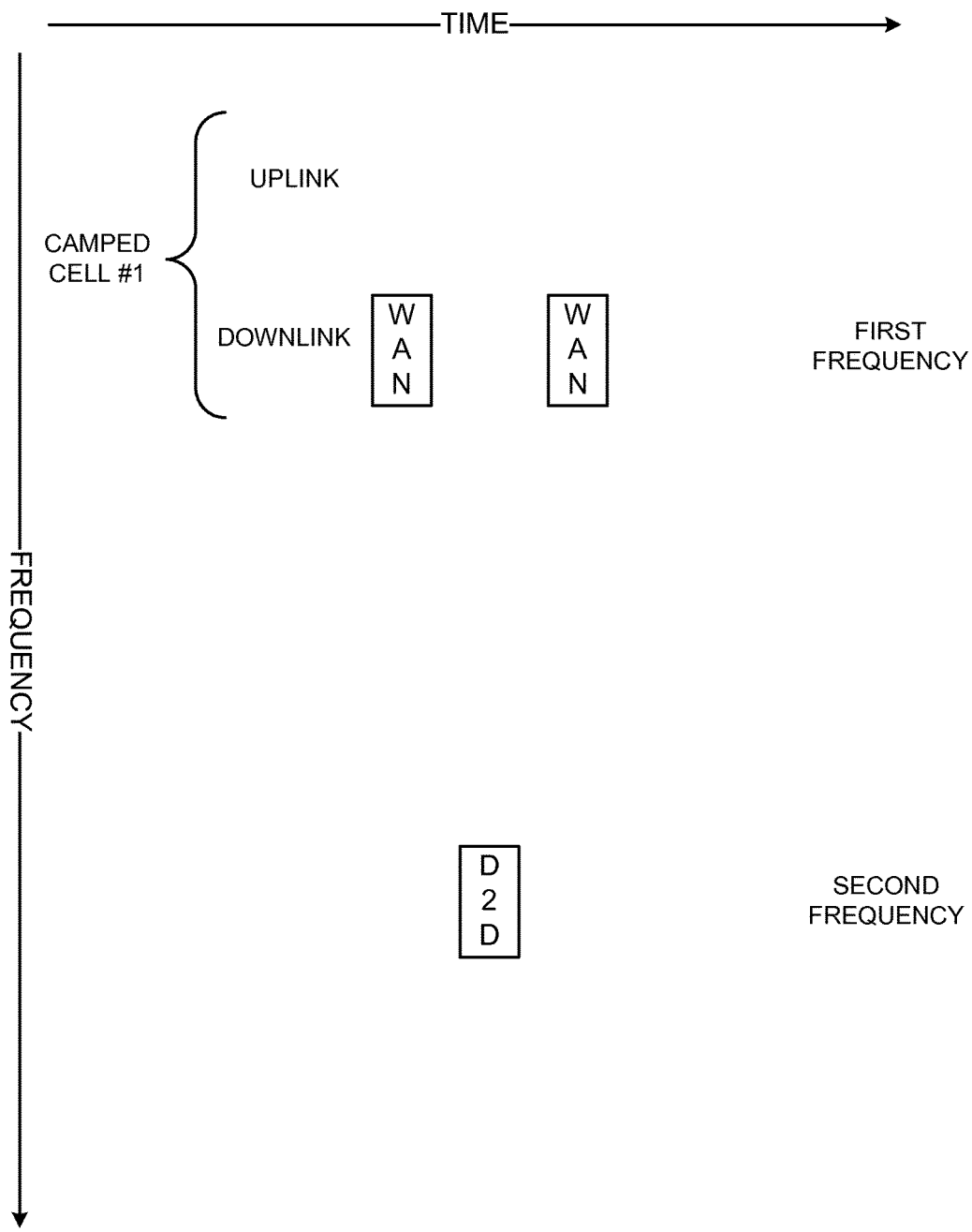
FIG. 15 shows a example of multi-carrier communications for UE in RRC_IDLE receiving WAN signals in first carrier frequency (ies) and transmitting D2D signals in second carrier frequency(ies), where simultaneous transmission is not supported.

In FIG. 7 to FIG. 15, examples of conditions of transmissions and receptions on WAN and D2D from a wireless terminal perspective are shown for multi-carrier communications situations. But applicability of the technology disclosed herein for multi-carrier communications is not be limited to these examples. FIG. 7 shows a case scenario MCC_1.A for a wireless terminal in RRC_CONECTED. FIG. 8 shows a case scenario MCC_1.B for a wireless terminal in RRC_CONNECTED. FIG. 9 shows a case scenario MCC_2.A for a wireless terminal in RRC_CONECTED. FIG. 10 shows a case scenario MCC_2.B for a wireless terminal in RRC_CONECTED. FIG. 11 shows a case scenario MCC_3.A for a wireless terminal in RRC_CONECTED. FIG. 12 shows a case scenario MCC_3.B for a wireless terminal in RRC_CONECTED. FIG. 13 shows sharing a frequency by WAN and D2D described above. FIG. 14 shows a case scenario for a wireless terminal in RRC_IDLE. FIG. 15, shows a case scenario for a wireless terminal in RRC_IDLE.

FIG. 7-FIG. 15 thus show, from the perspective of a wireless terminal, several example scenarios of timing of transmission of various signals, including WAN signals (e.g., signals between the wireless terminal and a node 22) and device-to-device (D2D) signals (between the wireless terminal and another D2D-capable D2D wireless terminal). In FIG. 7 to FIG. 15, examples of conditions of transmissions and receptions on WAN and D2D from a wireless terminal perspective are shown but conditions may not be limited to these examples. FIG. 7-FIG. 13 show one or both of transmission and reception on a first frequency with a first serving cell (serving cell #1), transmission and reception on the first frequency with a second serving cell (serving cell #2), and transmission and reception on a second frequency with a non-serving cell (non-serving cell #3). FIG. 14 and FIG. 15 show transmissions for RRC_IDLE mode and thus transmissions with a camped cell.

Thus "multi-carrier communications" includes the following meaning/scenarios:

Scenario MCC_1: transmitting WAN signals in first carrier frequency(ies) and transmitting D2D signals in second carrier frequency(ies) for a wireless terminal in RRC_CONNECTED. Two cases of scenario MCC_1 are MCC_1.A and MCC_1.B. Case MCC_1.A, illustrated in FIG. 7, comprises and supports simultaneous transmission, e.g., time overlapping transmission. Case MCC_1.B, illustrated in FIG. 8, does not comprise or support time overlapping, so that transmission in either first or second carrier frequency is supported at given time, but not both.

Scenario MCC_2: receiving WAN signals in first carrier frequency(ies) and transmitting D2D signals in second carrier frequency(ies) for a wireless terminal in RRC_CONNECTED. Two example cases of scenario MCC_2 are MCC_2. A and MCC_2.B. Case MCC_2.A, illustrated in FIG. 9, comprises or supports simultaneous reception and transmission (time overlapping reception). Case MCC_2.B, illustrated in FIG. 10, does not support time overlapping, so that either reception in the first carrier frequency(ies) or transmission in the second carrier frequency(ies) is supported at given time.

Scenario MCC_3: receiving and/or transmitting WAN signals in the first carrier frequency(ies) and transmitting D2D signals in the second carrier frequency(ies). For scenario MCC_3 the wireless terminal is in RRC_CONNECTED. Two example case of scenario MCC_3 are MCC_3.A and MCC_3. B. Case MCC_3.A, illustrated in FIG. 11, comprises or supports simultaneous reception/transmission and transmission (e.g., time overlapping transmission in the first frequency(ie) and second frequency (iew). Case MCC_3.B, illustrated in FIG. 12, does not support time overlapping, so that either reception/transmission in first carrier frequency(ies) or transmission in second carrier frequency(ies) is supported at given time.

Scenario MCC_4: communications in first carrier frequency(ies) and second carrier frequency(ies). Scenario MCC_4 is shown in FIG. 13, a "shared" cased in which (for example) both WAN signals and D2D signals share a carrier frequency (e.g., the first carrier frequency from serving cell #2).

Scenario MCC_5: communications with multiple RF with a wireless terminal in RRC_IDLE as shown in FIG. 16.

Scenario MCC_6: transmitting D2D signals by additional RF in second carrier frequency(ies) with a wireless terminal in RRC_IDLE as shown in FIG. 16.

Figure 1G:
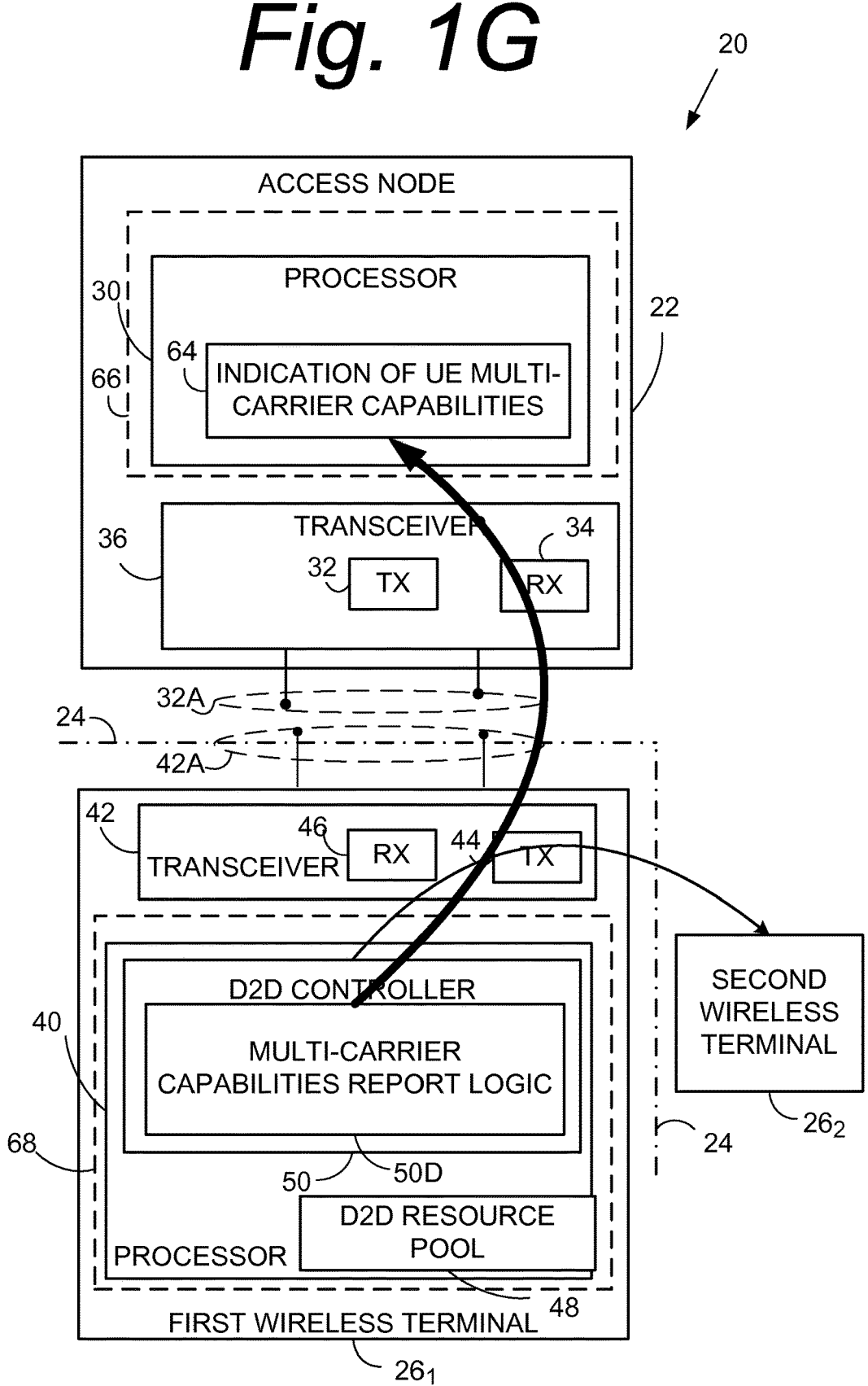

As one aspect of the technology disclosed herein, capability information of a wireless terminal related to support of above alternatives for each band combination may be informed from the wireless terminal to the eNodeB. In this regard, the device-to-device (D2D) controller 50 of the example embodiment and mode of FIG. 1G comprises multi-carrier communications capabilities report logic 50D, also known as multi-carrier communications capabilities report generator 50D. Thus, the wireless terminal of FIG. 1G includes a processor which is configured to generate an indication of capability of the wireless terminal to support multi-channel communications comprising plural frequency bands. FIG. 1G shows an indication of UE multi-carrier communications capability 64 being provided by the wireless terminal to node 22 as depicted by the arrow in FIG. 1G. Thus, the device-to-device (D2D) controller 50 and thus the processor 40 of the wireless terminal is configured to generate capability information related to support transmission of D2D communications for combinations of the plural frequency bands. The transceiver 42 sends the capability information to the node 22 and uses at least one of the plural frequency bands for device-to-device (D2D) communications in sending device-to-device (D2D) communications to another wireless terminal, e.g., wireless terminal $26_2$ The D2D resource allocation techniques or methods for which capabilities of the wireless terminal which may be communicated to the node in the UE multi-carrier communications capability indication 64 comprise the following:

If UE is in RRC_CONNECTED state in first carrier frequency(ies), and if UE is capable of D2D communications and multi-carrier communications, and if UE is interested in transmitting D2D signals in second carrier frequency(ies), UE uses only mode 2 to transmit D2D signal in the second carrier frequency(ies). In the second carrier frequencies, UE may determine whether it can use mode 2 or not based on single carrier frequency condition.

If UE is in RRC_CONNECTED state using resource allocation mode 1 in first carrier frequency(ies), and if UE is capable of multi-carrier communications, and if UE is interested in transmitting another D2D signals in second carrier frequency(ies), UE uses only mode 2 to transmit that D2D signals in the second carrier frequency(ies). In the second carrier frequency(ies), UE may determine whether it can use mode 2 or not based on single carrier frequency condition.

If UE is in RRC_CONNECTED state using resource allocation mode 1 in first carrier frequency(ies), and if UE is capable of multi-carrier communications, and if UE is interested in transmitting another D2D signals in second carrier frequency(ies), UE is prohibited to transmit that D2D signals with any mode in the second carrier frequency(ies) (No simultaneous D2D transmissions are allowed).

If UE is in RRC_CONNECTED state using resource allocation mode 2 in first carrier frequency(ies), and if UE is capable of multi-carrier communications, and if UE is interested in transmitting another D2D signals in second carrier frequency(ies), UE uses only mode 2 to transmit that D2D signal in the second carrier frequency(ies). In the second carrier frequency(ies), UE may determine whether it can use mode 2 or not based on single carrier frequency condition.

If UE is in RRC_CONNECTED state using resource allocation mode 2 in first carrier frequency(ies), and if UE is capable of multi-carrier communications, and if UE is interested in transmitting another D2D signals in second carrier frequency(ies), UE is prohibited to transmit that D2D signals with any mode in the second carrier frequency(ies) (No simultaneous D2D transmission are allowed).

If UE is in RRC_IDLE state and camps on a first carrier frequency, and if UE is capable of D2D communications and multi-carrier communications, and if UE is interested in transmitting D2D signals in the second carrier frequency(ies), UE uses only mode 2 to transmit D2D signals in the second carrier frequency. In the second carrier frequency(ies), UE may determine whether it can use mode 2 or not based on single carrier frequency condition.

If UE is in RRC_IDLE state using resource allocation mode 2 and is camped in a first carrier frequency, and if UE is capable of multi-carrier communications, and if UE is interested in transmitting another D2D signals in the second carrier frequency, UE uses only mode 2 to transmit D2D signal in the second carrier frequency. In the second carrier frequency(ies), UE may determine whether it can use mode 2 or not based on single carrier frequency condition.

If UE is in RRC_IDLE state using resource allocation mode 2 and is camped in a first carrier frequency, and if UE is capable of multi-carrier communications, and if UE is interested in transmitting another D2D signals in second carrier frequency(ies), UE is prohibited to transmit that D2D signal with any mode in the second carrier frequency(ies) (No simultaneous D2D transmission are allowed).

From the foregoing it can be seen that the processor of the wireless terminal of FIG. 1G is configured, as included in the techniques listed above, to make a determination whether the wireless terminal is to use only wireless terminal autonomous selected device-to-device (D2D) radio resources to transmit a device-to-device (D2D) signal in a second carrier frequency to another D2D-capable wireless terminal when the wireless terminal is either (1) in RRC_IDLE mode and camping on a first carrier frequency or (2) in RRC_CONNECTED mode and served by a serving cell in a first carrier frequency.

As explained above, in multi-carrier communications plural frequency bands may comprise a first frequency carrier and a second frequency carrier. Therefore in the embodiment and mode of FIG. 1G, the processor 40 may make a determination of one or more resource allocation techniques that the wireless terminal is eligible to employ for the multi-band frequencies. Further, it is understood from the foregoing listing of techniques that the processor may make the determination of the one or more resource allocation techniques based on one or more of the following: a radio resource control state of the wireless terminal; and, a type of radio resources allocated to a first frequency carrier.

The capability indication 64 may comprises identification of the one or more resource allocations techniques (such as the above-listed techniques) that the wireless terminal is eligible to employ for the multi-band frequencies.

H. Hardware Implementations

Figure 1H:
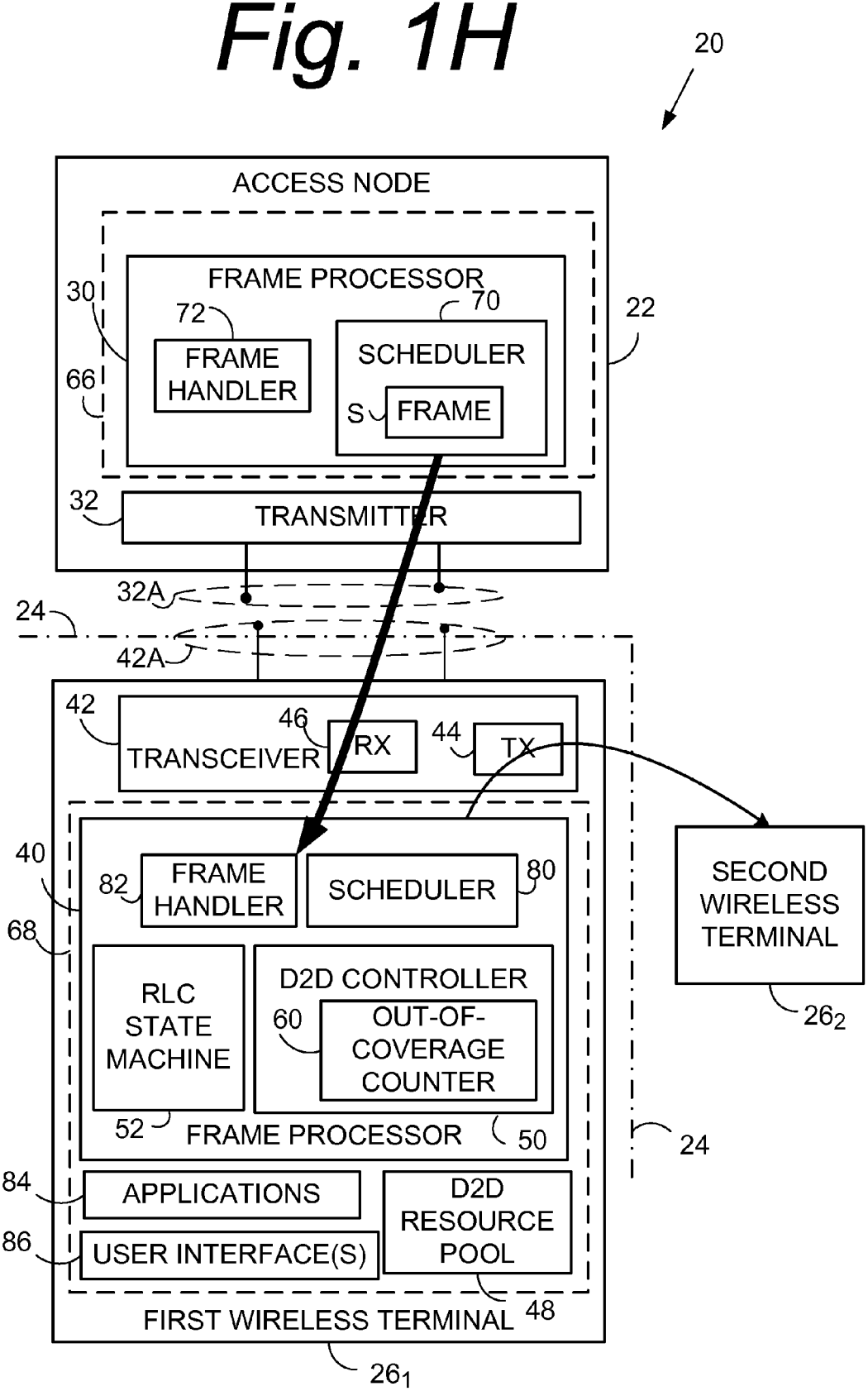
FIG. 1H is a schematic view of a more detailed example implementation which may be implemented for any or all of the embodiments of FIG. 1A-FIG. 1G.

FIG. 1H shows in more detail an example embodiment of the radio communications network of any and all of the example embodiments and modes of FIG. 1A-FIG. 1G. It should be appreciated that FIG. 1H is just one example implementation of how the node 22 and first wireless terminal $26_1$ may be carried out structurally and/or functionally. The example embodiments an modes of FIG. 1A-FIG. 1G are preferably implemented using electronic machinery. The node 22 comprises node electronic machinery 66; first wireless terminal $26_1$ comprises terminal electronic machinery 68. In FIG. 1A-FIG. 1H various units and functionalities as framed by broken lines of node 22 and first wireless terminal $26_1$ are implemented by node electronic machinery 66 and terminal electronic machinery 68, respectively. What comprises node "electronic machinery" is discussed in more detail with reference to FIG. 5.

In the example embodiment of FIG. 1H the node 22 comprises node processor 30, also known as a frame processor, and node transmitter 32. The node transmitter 32 typically includes plural antenna 32A. The node processor 30 is shown in more detail as comprising node scheduler 70 and node frame handler 72. In essence, the node scheduler 70 prepares or formats, into frames, information to be transmitted by node transmitter 32 on the downlink (DL) from node 22 to first wireless terminal $26_1$ (as well as to other wireless terminals). The node frame handler 72 serves, e.g., to process information received in frames on the uplink from wireless terminals, e.g., first wireless terminal $26_1$.

The first wireless terminal $26_1$ comprises terminal processor 40 and terminal transceiver 42. The terminal transceiver 42 typically includes plural antenna 42A. The terminal processor 40 of first wireless terminal $26_1$ of FIG. 1H, also known as a frame processor, comprises terminal scheduler 80 and terminal frame handler 82. The terminal frame handler 82 analyzes a downlink (DL) portion of a frame as received over radio interface 24 from node 22. The terminal scheduler 80 prepares uplink frame for transmission to node 22 or, in the case of device-to-device (D2D) communications, to other wireless terminals such as wireless terminal $26_2$.

The first wireless terminal $26_1$ also comprises executable applications 84 and one or more user interfaces (GUIs) 86. The user interfaces (GUIs) 86 may be used to operate or interact with one or more of the executable applications 84. One or more of the applications 84, when executed, may prompt or involve device-to-device (D2D) communications with another wireless terminal, e.g., second wireless terminal $26_2$. When device-to-device (D2D) communications are invoked or initiated by an application, terminal D2D controller 50 superintends or controls the device-to-device (D2D) communications.

Figure 5:
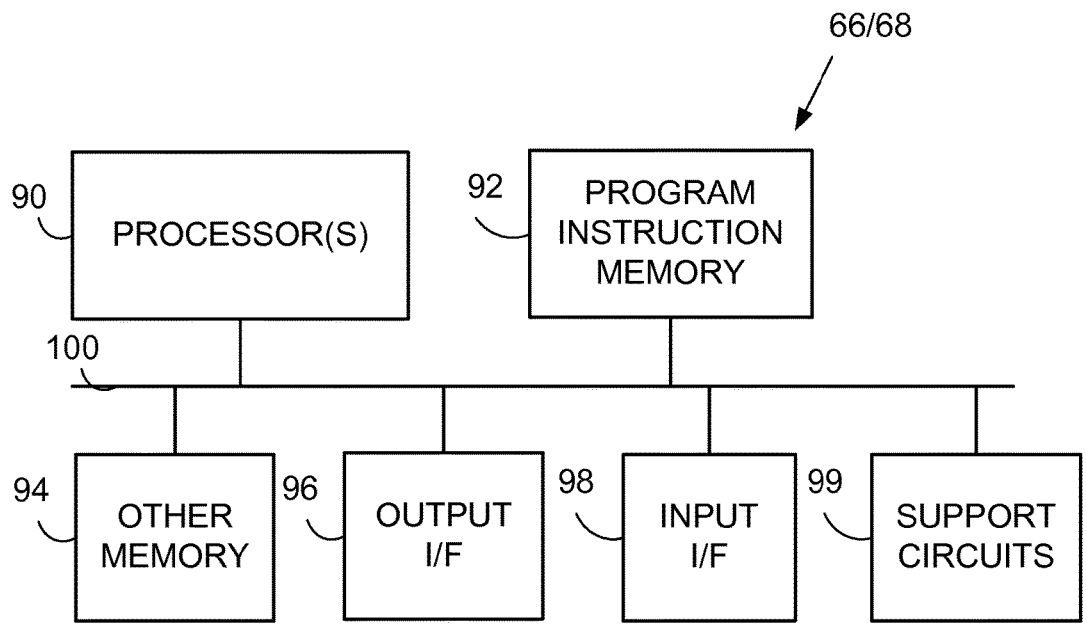
FIG. 5 is a schematic view illustrating an example embodiment of electronic machinery that may comprise a radio access node and/or a wireless terminal.

It was mentioned above that certain units and functionalities of node 22 framed by broken line are, in an example embodiment, implemented by node electronic machinery 66. Similarly, certain units and functionalities of first wireless terminal $26_1$ framed by broken line are, in an example embodiment, implemented by terminal electronic machinery 68. FIG. 5 shows an example of such electronic machinery, whether node electronic machinery 66 or terminal electronic machinery 68, as comprising one or more processors 90, program instruction memory 92; other memory 94 (e.g., RAM, cache, etc.); input/output interfaces 96; peripheral interfaces 98; support circuits 99; and busses 100 for communication between the aforementioned units.

The memory 94, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 99 are coupled to the processors 90 for supporting the processor in a conventional manner. These circuits include cache, power supplies, clock circuits, input/output circuitry and subsystems, and the like.

The resource mode counter 60 may be realized by any appropriate structure, such as a timer (e.g., a clock-down timer) or other event counter that reasonably accurately detects lapse of time since a predetermined Idle State transition. In an example implementation, a timer which is set at an initial value which is decremented is utilized. Alternatively, a count-up timer which, after a predetermined state transition is utilized, reaches a maximum time-out value may be used to determine out-of-coverage.

According to the technology disclosed herein, upon any state transition to Any Cell Selection State (Camped Normally state to Any Cell Selection State, Camped on Any Cell state to Any Cell Selection State), the wireless terminal shall start resource mode counter 60. Upon any state transition to Camped Normally on non-D2D frequencies, the wireless terminal shall start the resource mode counter 60, if it is not running or not expired. Upon any state transition to Camped on Any Cell on non-D2D frequencies, the wireless terminal shall start the resource mode counter 60, if it is not running or not expired. For additional safety (as an optional feature), to provide robustness, it is possible that upon any state transition to Any Cell Selection State, upon any state transition to Camped Normally on non-D2D frequencies or upon any state transition to Camped on Any Cell on non-D2D frequencies, the wireless terminal may be triggered to restart the counter 60, if the counter 60 is running.

The technology disclosed herein provides numerous benefits, including determining out-of-coverage condition on the basis of downlink received power since camping procedures are essentially based on downlink received power. In addition, counters such as resource mode counter 60 are easily implemented in current networks such as Long Term Evolution (LTE) networks. Yet further, impacts on both legacy Long Term Evolution (LTE) specifications and current cellular services are minimized.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Some the terminology employed for concepts as described herein has been updated or changed in more recent industry documentation, such as the 3GPP Technical Standards, for example. As mentioned above, "device-to-device (D2D)" is now also called "sidelink direct". Some other terminology has also changed, a partial listing appearing in Table 1 below.

TABLE 1

| Terminology | |
| --- | --- |
| Previous Terminology | New Terminology |
| Schedule assignment SA | SCI (Sidelink Control Information) on PSCCH (Physical Sidelink Control Channel) |
| PD2DSCH (Phys. D2D Synch. Channel) | PSBCH (Phys. Sidelink Broadcast Channel) |
| D2DSS (D2D synchronization signals) | SLSS (Sidelink Synchronization Signals) |

TABLE 1-continued

| Terminology | |
|---|---|
| Previous Terminology | New Terminology |
| D2D Communications or Data Channel | PSSCH (Physical Sidelink Shared Channel) |
| D2D Discovery Channel | DSDCH |

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method in a wireless terminal, the method comprising:
generating a radio resource control (RRC) message including wireless terminal capability information, for each of one or more band combinations, indicating whether or not the wireless terminal, which is a user equipment (UE), supports simultaneous transmission of a plurality of communications consisting of (i) communication between the wireless terminal and a base station and (ii) device-to-device (D2D) communication directly performed between the wireless terminal and another wireless terminal, wherein the wireless terminal supports the communication between the wireless terminal and the base station in the one or more band combinations;
transmitting the radio resource control (RRC) message to the base station; and
performing, based on wireless terminal capability indicated by the wireless terminal capability information, the communication between the wireless terminal and the base station; wherein the wireless terminal in RRC_CONNECTED is served in a serving cell in a first carrier frequency, and the wireless terminal performs the D2D communication in a second carrier frequency.

2. The method of the claim 1, wherein the second carrier frequency is different from the first carrier frequency.

3. The method of the claim 1, wherein the one or more band combinations are according to supported carrier aggregation band combination(s).

4. A wireless terminal comprising:
processing circuitry configured to generate a radio resource control (RRC) message including wireless terminal capability information, for each of one or more band combinations, indicating whether or not the wireless terminal, which is a user equipment (UE), supports simultaneous transmission of a plurality of communications consisting of (i) communication between the wireless terminal and a base station and (ii) device-to-device (D2D) communication directly performed between the wireless terminal and another wireless terminal, wherein the wireless terminal supports the communication between the wireless terminal and the base station in the one or more band combinations;
transmitting circuitry configured to transmit the radio resource control (RRC) message to the base station; wherein
the processing circuitry is further configured to perform, based on wireless terminal capability indicated by the wireless terminal capability information, the communication between the wireless terminal and the base station; wherein the wireless terminal in RRC_CONNECTED is served in a serving cell in a first carrier frequency, and the wireless terminal performs the D2D communication in a second carrier frequency.

5. The wireless terminal of the claim 4, wherein the second carrier frequency is different from the first carrier frequency.

6. The wireless terminal of the claim 4, wherein the one or more band combinations are according to supported carrier aggregation band combination(s).

* * * * *